(12) United States Patent
Zhang et al.

(10) Patent No.: US 10,985,897 B2
(45) Date of Patent: Apr. 20, 2021

(54) METHODS AND APPARATUS FOR DYNAMIC TIME-DIVISION DUPLEXING (TDD)

(71) Applicant: QUALCOMM Incorporated, San Diego, CA (US)

(72) Inventors: Xiaoxia Zhang, San Diego, CA (US); Taesang Yoo, San Diego, CA (US); Yongbin Wei, La Jolla, CA (US); Tamer Adel Kadous, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 268 days.

(21) Appl. No.: 16/118,395

(22) Filed: Aug. 30, 2018

(65) Prior Publication Data

US 2019/0081768 A1 Mar. 14, 2019

Related U.S. Application Data

(60) Provisional application No. 62/557,007, filed on Sep. 11, 2017.

(51) Int. Cl.
*H04L 5/14* (2006.01)
*H04L 5/00* (2006.01)
(Continued)

(52) U.S. Cl.
CPC .............. *H04L 5/14* (2013.01); *H04L 5/0094* (2013.01); *H04W 72/0406* (2013.01);
(Continued)

(58) Field of Classification Search
CPC ...... H04J 11/0023; H04L 5/14; H04L 5/0094; H04L 5/005; H04L 5/0051; H04W 74/006;
(Continued)

(56) References Cited

U.S. PATENT DOCUMENTS

| 9,693,367 B2* | 6/2017 | Fang ................ H04W 74/0816 |
| 2005/0141449 A1* | 6/2005 | Yuang .................. H04W 74/08 370/329 |

(Continued)

OTHER PUBLICATIONS

International Preliminary Report on Patentability—PCT/US2018/049425, The International Bureau of WIPO—Geneva, Switzerland, dated Mar. 26, 2020.
(Continued)

*Primary Examiner* — Chi H Pham
*Assistant Examiner* — Weibin Huang
(74) *Attorney, Agent, or Firm* — Qualcomm Incorporated

(57) ABSTRACT

Wireless communication apparatus and methods related to dynamic TDD are described. In aspects, a method of wireless communication over a shared medium may include, receiving, from a base station, control information in a first portion of a transmission opportunity (TXOP), wherein the control information indicates a configuration for triggering a communication of at least one shared medium reservation signal associated with one or more remaining portions of the TXOP; and in response to receiving the control information in the first portion of the TXOP, monitoring for or transmitting the at least one shared medium reservation signal, based on the configuration.

22 Claims, 12 Drawing Sheets

(51) Int. Cl.
*H04W 74/08* (2009.01)
*H04W 72/04* (2009.01)
*H04W 74/00* (2009.01)
*H04J 11/00* (2006.01)
*H04W 88/02* (2009.01)
*H04W 88/08* (2009.01)

(52) U.S. Cl.
CPC ...... *H04W 74/0816* (2013.01); *H04J 11/0023* (2013.01); *H04L 5/005* (2013.01); *H04L 5/0051* (2013.01); *H04W 74/006* (2013.01); *H04W 88/02* (2013.01); *H04W 88/08* (2013.01)

(58) Field of Classification Search
CPC . H04W 88/02; H04W 88/08; H04W 72/0406; H04W 74/0816
See application file for complete search history.

(56) References Cited

U.S. PATENT DOCUMENTS

| 2013/0051256 | A1* | 2/2013 | Ong | H04W 74/0816 |
| | | | | 370/252 |
| 2016/0183296 | A1 | 6/2016 | Yerramalli et al. | |
| 2016/0183302 | A1 | 6/2016 | Chen et al. | |
| 2017/0048861 | A1* | 2/2017 | Choi | H04L 5/0053 |
| 2017/0311322 | A1* | 10/2017 | Kim | H04L 25/0224 |
| 2019/0075596 | A1* | 3/2019 | Ye | H04L 5/0035 |

OTHER PUBLICATIONS

International Search Report and Written Opinion—PCT/US2018/049425—ISA/EPO—dated Dec. 3, 2018.

* cited by examiner

METHODS AND APPARATUS FOR DYNAMIC TIME-DIVISION DUPLEXING (TDD)

CROSS REFERENCE TO RELATED APPLICATIONS

This application for patent claims priority to U.S. provisional application No. 62/557,007, filed Sep. 11, 2017, which is hereby incorporated by reference in its entirety.

FIELD

This application relates to wireless communication systems, and more particularly to methods and apparatus for dynamic time-division duplexing (TDD) (e.g., transmission opportunity-based dynamic TDD).

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system). A wireless multiple-access communications system may include a number of base stations (BSs), each simultaneously supporting communication for multiple communication devices, which may be otherwise known as user equipment (UE).

A wireless communications system may operate over a shared medium or spectrum, meaning that the wireless communications system includes one or more frequency bands that may be shared by multiple network operating entities. In some instances, multiple network operating entities may share their licensed spectrum with each other or with other third-party operators to better utilize the spectrum. One approach to sharing a medium or a spectrum is to employ a priority-based coordinated access scheme. In the priority-based coordinated access scheme, a shared spectrum is partitioned into multiple time periods. At any time period, one operator may be a primary user and have priority to access the spectrum while other operators may opportunistically access to the spectrum when the spectrum is available.

In addition to prioritizing medium or spectrum access for different network operating entities, the scheme can prioritize shared medium or spectrum access for different communication directions within a network operating entity. While the scheme allows for dynamic TDD, where a link communication direction priority can be changed from a default link communication direction, a target receiver of a low priority link communication direction has no knowledge of whether a transmitter of the low priority link communication direction may proceed with a transmission as scheduled or yield medium access to a high priority link communication direction.

SUMMARY

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication, for example, by a UE, includes: receiving, from a base station, control information in a first portion of a transmission opportunity (TXOP), wherein the control information indicates a configuration for triggering a communication of at least one shared medium reservation signal associated with one or more remaining portions of the TXOP; and in response to receiving the control information in the first portion of the TXOP, monitoring for or transmitting the at least one shared medium reservation signal, based on the configuration.

In an additional aspect of the disclosure, an apparatus for wireless communication includes: at least one processor; memory coupled to the at least one processor; and instructions stored in the memory and executable by the at least one processor to cause the apparatus to: receive, from a base station, control information in a first portion of a transmission opportunity (TXOP), wherein the control information indicates a configuration for triggering a communication of at least one shared medium reservation signal associated with one or more remaining portions of the TXOP; and in response to receiving the control information in the first portion of the TXOP, monitor for or transmitting the at least one shared medium reservation signal, based on the configuration.

In an additional aspect of the disclosure, an apparatus for wireless communication includes: means for receiving, from a base station, control information in a first portion of a transmission opportunity (TXOP), wherein the control information indicates a configuration for triggering a communication of at least one shared medium reservation signal associated with one or more remaining portions of the TXOP; and means for, in response to receiving the control information in the first portion of the TXOP, monitoring for or transmitting the at least one shared medium reservation signal, based on the configuration.

In an additional aspect of the disclosure, a computer-readable medium having program code recorded thereon, the program code includes code for causing a wireless communication device to: receive, from a base station, control information in a first portion of a transmission opportunity (TXOP), wherein the control information indicates a configuration for triggering a communication of at least one shared medium reservation signal associated with one or more remaining portions of the TXOP; and in response to receiving the control information in the first portion of the TXOP, monitor for or transmit the at least one shared medium reservation signal, based on the configuration.

In an additional aspect of the disclosure, a method for wireless communication, for example, by a BS, includes: transmitting, to a user equipment (UE), control information in a first portion of a transmission opportunity (TXOP), wherein the control information indicates a configuration for triggering a communication of at least one shared medium reservation signal associated with one or more remaining portions of the TXOP; and monitoring for or transmitting the at least one shared medium reservation signal, based on the configuration.

In an additional aspect of the disclosure, an apparatus for wireless communication includes: at least one processor; memory coupled to the at least one processor; and instructions stored in the memory and executable by the at least one processor to cause the apparatus to: transmit, to a user equipment (UE), control information in a first portion of a transmission opportunity (TXOP), wherein the control information indicates a configuration for triggering a communication of at least one shared medium reservation signal associated with one or more remaining portions of the TXOP; and monitor for or transmitting the at least one shared medium reservation signal, based on the configuration.

In an additional aspect of the disclosure, an apparatus for wireless communication includes: means for transmitting, to a user equipment (UE), control information in a first portion of a transmission opportunity (TXOP), wherein the control information indicates a configuration for triggering a communication of at least one shared medium reservation signal associated with one or more remaining portions of the TXOP; and means for monitoring for or transmitting the at least one shared medium reservation signal, based on the configuration.

In an additional aspect of the disclosure, a computer-readable medium having program code recorded thereon, the program code includes code for causing a wireless communication device to: transmit, to a user equipment (UE), control information in a first portion of a transmission opportunity (TXOP), wherein the control information indicates a configuration for triggering a communication of at least one shared medium reservation signal associated with one or more remaining portions of the TXOP; and monitor for or transmit the at least one shared medium reservation signal, based on the configuration.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
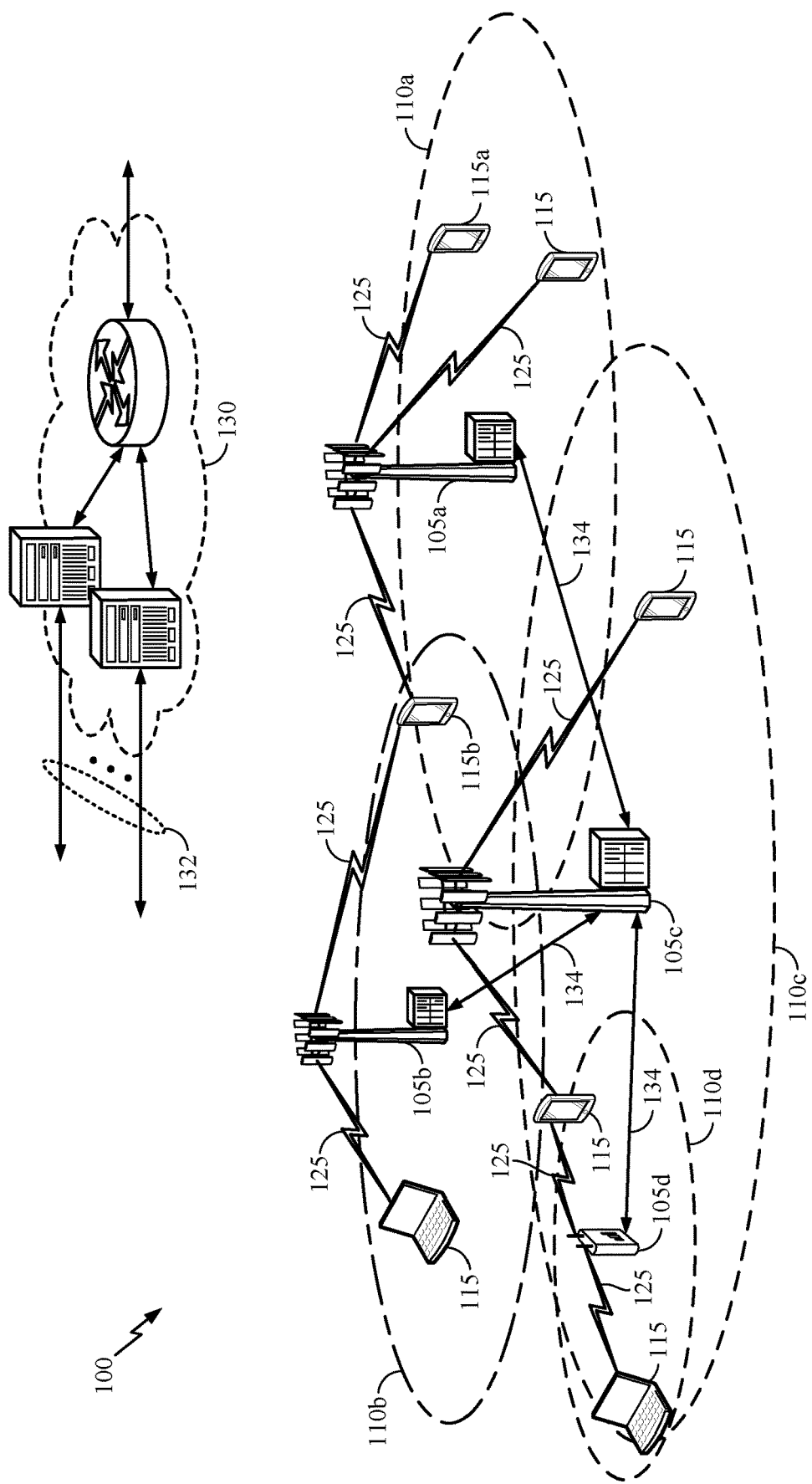
FIG. 1 illustrates a wireless communication network in accordance with various aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as code-division multiple access (CDMA), time-division multiple access (TDMA), frequency-division multiple access (FDMA), orthogonal frequency-division multiple access (OFDMA), single-carrier FDMA (SC-FDMA) and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and radio technologies mentioned above as well as other wireless networks and radio technologies, such as a next generation (e.g., 5th Generation (5G) operating in mmWave bands) network.

The present disclosure describes mechanisms for dynamic TDD, for example transmission opportunity-based dynamic TDD. In a priority-based medium sharing scheme, one link communication direction may have priority over another link communication direction for accessing medium a transmission opportunity (TXOP). In aspects, a TXOP in a medium includes a transmission opportunity in a frequency band. For dynamic TDD, a DL-granting BS may transmit a DL schedule to a UE for a DL communication in the TXOP, while a UL-granting BS may transmit a UL schedule to another UE for a UL communication in the TXOP. The target receiver of the high-priority link communication direction may transmit a medium reservation signal to indicate a reservation for the TXOP (e.g., reservation of medium access for one or more portions of the TXOP) and/or to silence nodes for the low-priority link communication direction. The target transmitter for the low-priority link communication direction may monitor the medium for a reservation signal from the high-priority link communication direction. For a DL communication, the granting BS is a target transmitter and the scheduled UE is a target receiver. Conversely, for a UL communication, the scheduled UE is a target transmitter and the granting BS is a target receiver. For example, for a BS transmitting to a UE in a default downlink direction, or for a BS receiving from a UE in a default uplink direction, the link direction and the associated node(s) may be considered high priority, and for a BS switching a default downlink direction to uplink, or for a BS switching a default uplink direction to downlink, the switched link direction and the associated node(s) may be considered low priority. As an example, BS X may plan to transmit to UE X in a default downlink direction (high priority) while BS Y may plan to switch a default downlink direction to UE Y to UL direction (low priority), making the UE Y the potential aggressor to the default downlink direction in terms of, e.g., interference. Therefore, coordination is needed such that, for example, a high-priority node (UE X) transmits a reservation response signal and a low-priority node (UE Y) monitors or senses for the reservation response signal before transmitting. In aspects, methods and apparatus are provided for dynamic TDD in which overhead costs of medium sharing are incurred in one or more portions (e.g., portions) of a TXOP, so subsequent portions of the TXOP incur reduced and/or no medium sharing overhead costs. For example, in aspects, the present methods and apparatus may incur processing and/or time/frequency resource costs for control signaling associated with spectrum sharing for the TXOP in one or more portions (e.g., portions) of a TXOP so subsequent portions of the TXOP incur reduced and/or no medium sharing overhead costs.

Aspects of the present disclosure may optionally be used to, for example, provide several benefits. For example, communication based on medium monitoring or sensing enable a target transmitter of a low-priority link to utilize at least some portions of resources in the medium instead of refraining from accessing the medium and abandoning the scheduled communication. Thus, the present disclosure can improve spectrum utilization efficiency while controlling interference between UL and DL. In addition, the present methods and apparatus are provided for dynamic TDD enable the target receiver of a low-priority link to receive data according to the updated TDD instead of blind decoding, which may be complex and less accurate.

FIG. 1 illustrates a wireless communication network 100 in accordance with various aspects of the present disclosure. The network 100 includes BSs 105, UEs 115, and a core network 130. In some embodiments, the network 100 operates over a shared spectrum. The shared spectrum may be unlicensed or partially licensed to one or more network operators. Access to the spectrum may be limited and may be controlled by a separate coordination entity. In some embodiments, the network 100 may be a LTE or LTE-A network. In yet other embodiments, the network 100 may be a millimeter wave (mmW) network, a new radio (NR) network, a 5G network, or any other successor network to LTE. The network 100 may be operated by more than one network operator. Wireless resources may be partitioned and arbitrated among the different network operators for coordinated communication between the network operators over the network 100.

The BSs 105 may wirelessly communicate with the UEs 115 via one or more BS antennas. Each BS 105 may provide communication coverage for a respective geographic coverage area 110. In 3GPP, the term "cell" can refer to this particular geographic coverage area of a BS and/or a BS subsystem serving the coverage area, depending on the context in which the term is used. In this regard, a BS 105 may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell may generally cover a relatively smaller geographic area and may allow unrestricted access by UEs with service subscriptions with the network provider. A femto cell may also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a pico cell may be referred to as a pico BS. A BS for a femto cell may be referred to as a femto BS or a home BS. In the example shown in FIG. 1, the BSs 105a, 105b and 105c are examples of macro BSs for the coverage areas 110a, 110b and 110c, respectively. The BSs 105d is an example of a pico BS or a femto BS for the coverage area 110d. As will be recognized, a BS 105 may support one or multiple (e.g., two, three, four, and the like) cells.

Communication links 125 shown in the network 100 may include uplink (UL) transmissions from a UE 115 to a BS 105, or downlink (DL) transmissions, from a BS 105 to a UE 115. The UEs 115 may be dispersed throughout the network 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, or the like.

The BSs 105 may communicate with the core network 130 and with one another. The core network 130 may provide user authentication, access authorization, tracking, Internet Protocol (IP) connectivity, and other access, routing, or mobility functions. At least some of the BSs 105 (e.g., which may be an example of an evolved NodeB (eNB), a next generation NodeB (gNB), or an access node controller (ANC)) may interface with the core network 130 through backhaul links 132 (e.g., S1, S2, etc.) and may perform radio configuration and scheduling for communication with the UEs 115. In various examples, the BSs 105 may communicate, either directly or indirectly (e.g., through core network 130), with each other over backhaul links 134 (e.g., X1, X2, etc.), which may be wired or wireless communication links.

Each BS 105 may also communicate with a number of UEs 115 through a number of other BSs 105, where the BS 105 may be an example of a smart radio head. In alternative configurations, various functions of each BS 105 may be distributed across various BSs 105 (e.g., radio heads and access network controllers) or consolidated into a single BS 105.

In some implementations, the network 100 utilizes orthogonal frequency division multiplexing (OFDM) on the downlink and single-carrier frequency division multiplexing (SC-FDM) on the UL. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. The system bandwidth may also be partitioned into subbands.

In an embodiment, the BSs 105 can assign or schedule transmission resources (e.g., in the form of time-frequency resource blocks) for DL and UL transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes, for example, about 10. Each subframe can be divided into portions, for example, about 2. In a frequency-division duplexing (FDD) mode, simultaneous UL and DL transmissions may occur in different frequency bands. For example, each subframe includes a UL subframe in a UL frequency band and a DL subframe in a DL frequency band. In a time-division duplexing (TDD) mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational bandwidth or frequency band, each positioned at a pre-defined time and a pre-defined frequency. For example, a BS 105 may transmit references signals, such as cell-specific reference signals (CRSs) and/or channel state information-reference signals (CSI-RSs) to enable a UE 115 to estimate a DL channel. Similarly, a UE 115 may transmit reference signals such as sounding reference signals (SRSs) and/or demodulation reference signals (DM-RS) to enable a BS 105 to estimate a UL channel Control information may include resource assignments and protocol controls. Data may include protocol data and/or operational data. In some embodiments, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than UL communication. A UL-centric subframe may include a longer duration for UL communication than UL communication.

In an embodiment, a UE 115 attempting to access the network 100 may perform an initial cell search by detecting a primary synchronization signal (PSS) from a BS 105. The PSS may enable synchronization of period timing and may indicate a physical layer identity value. The UE 115 may then receive a secondary synchronization signal (SSS). The SSS may enable radio frame synchronization, and may provide a cell identity value, which may be combined with the physical layer identity value to identify the cell. The SSS may also enable detection of a duplexing mode and a cyclic prefix length. Some systems, such as TDD systems, may transmit an SSS but not a PSS. Both the PSS and the SSS may be located in a central portion of a carrier, respectively. After receiving the PSS and SSS, the UE 115 may receive a master information block (MIB), which may be transmitted in the physical broadcast channel (PBCH). The MIB may contain system bandwidth information, a system frame number (SFN), and a Physical Hybrid-ARQ Indicator Channel (PHICH) configuration. After decoding the MIB, the UE 115 may receive one or more system information blocks (SIB s). For example, SIB1 may contain cell access parameters and scheduling information for other SIBs. Decoding SIB1 may enable the UE 115 to receive SIB2. SIB2 may contain radio resource configuration (RRC) configuration information related to random access channel (RACH) procedures, paging, physical uplink control channel (PUCCH), physical uplink shared channel (PUSCH), power control, SRS, and cell barring. After obtaining the MIB and/or the SIBs, the UE 115 can perform random access procedures to establish a connection with the BS 105. After establishing the connection, the UE 115 and the BS 105 can enter a normal operation stage, where operational data may be exchanged.

In some embodiments, the UEs 115 and the BSs 105 may be operated by multiple network operators or network operating entities and may operate in a shared radio frequency spectrum, which may include licensed or unlicensed frequency bands. The shared spectrum may be time-partitioned for sharing among the multiple network operating entities to facilitate coordinated communication. For example, in the network 100, the BS 105a and the UE 115a may be associated with one network operating entity, while the BS 105b and the UE 115b may be associated with another network operating entity. By time-partitioning the shared spectrum according to network operating entities, the communications between the BS 105a and the UE 115a and the communications between the BS 105b and the UE 115b may each occur during respective time periods and may avail themselves of an entirety of a designated shared spectrum.

To support coordinated access of the shared spectrum, a BS 105 or an entity of the core network 130 may act as a central arbitrator to manage access and coordinate the partitioning of resources among different network operating entities operating within the network 100. In some embodiments, the central arbitrator may include a spectrum access system (SAS). In addition, the transmissions from the multiple network operating entities can be time synchronized to facilitate the coordination. Further, UL and DL access to the spectrum within a particular network operating entity can be prioritized and interference between UL and DL can be controlled and managed, as described in greater detailer herein.

Figure 2:
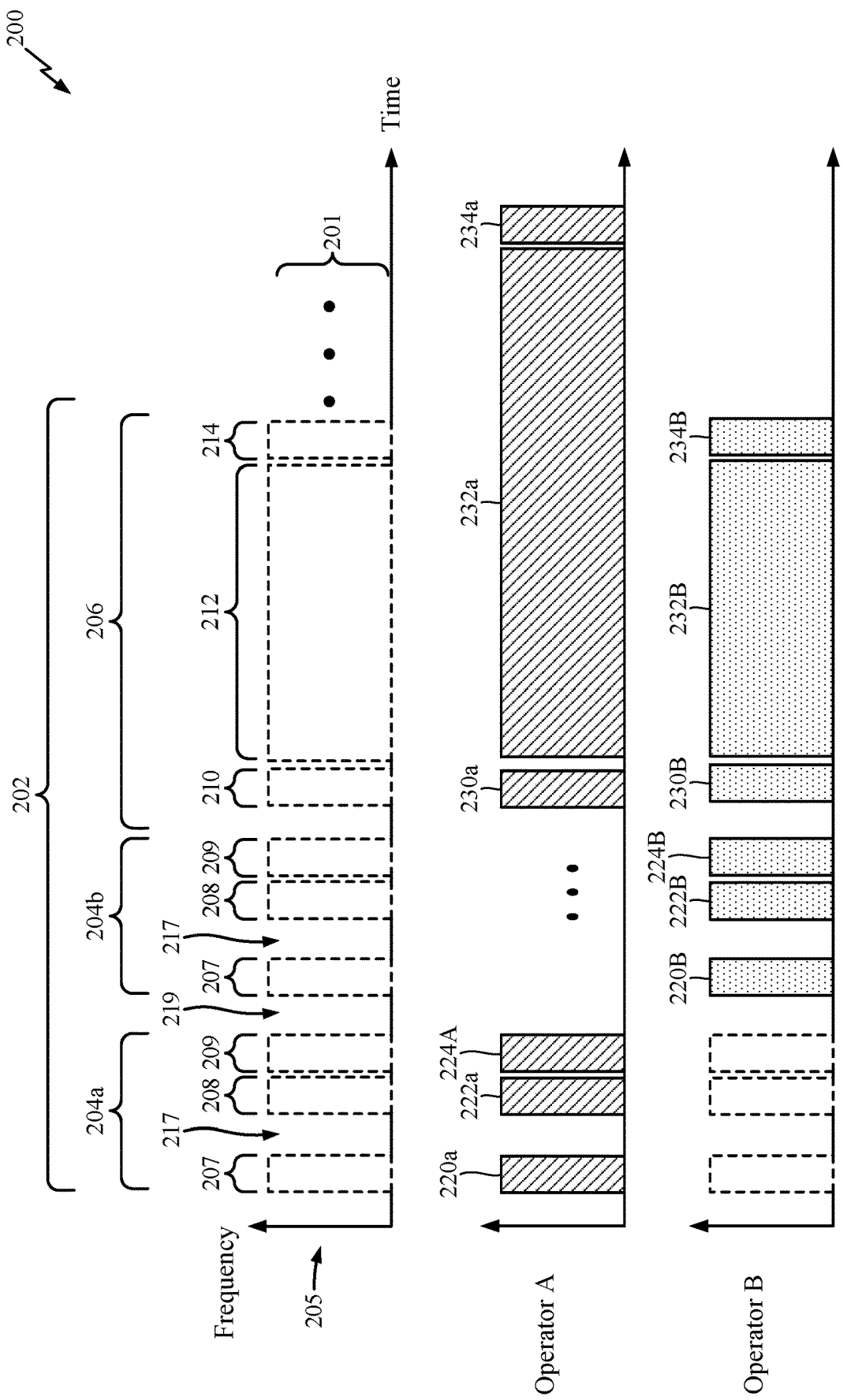
FIG. 2 illustrates a coordinated priority-based medium sharing scheme with interference management in accordance with various aspects of the present disclosure.

FIG. 2 illustrates a coordinated priority-based spectrum sharing scheme 200 with interference management in accordance with various aspects of the present disclosure. The x-axes represent time in some constant units. The y-axes represent frequency in some constant units. The scheme 200 may be employed by the BSs 105 and/or the UEs 115 to access a shared frequency band 201. While the scheme 200 illustrates coordinated spectrum access for two different network operating entities (e.g., Operator A network operating entity and Operator B network operating entity), the scheme 200 can be applied to any suitable number of network operating entities, including three, four, or more operating entities.

In the scheme 200, the frequency band 201 is time-partitioned into a plurality of transmit opportunities (TXOPs) 202 as shown in the frame structure 205. The TXOPs 202 may have a fixed duration and may be defined in units of OFDM symbols, subframes, portions, and/or any suitable time format. In some embodiments, the TXOP 202 may have a duration of about 10 milliseconds (ms) to about 40 ms. Each TXOP 202 includes a plurality of channel sensing or clear channel assessment (CCA) periods 204 followed by a transmission period 206. The CCA periods 204 are separated by a gap period 219. The frame structure 205 of the TXOP 202 can be predetermined and known by all network operating entities sharing the frequency band 201. The network operating entities may be time-synchronized when operating in the shared frequency band 201.

Each CCA period 204 can be assigned to a particular network operating entity (e.g., Operator A network operating entity or Operator B network operating entity). The assigned network operating entity may transmit a reservation in the CCA period 204 to reserve the following transmission period 206. Each CCA period 204 includes portions 207, 208, and 209. The portions 207 and 208 are separated by a gap period 217. The portions 207 are used for transmitting reservation request (RRQ) signals 220. Each RRQ signal 220 may include a predetermined preamble sequence, a request-to-send (RTS) signal, and/or transmission triggers (e.g., scheduling information). The portions 208 are used for transmitting reservation response (RRS) signals 222 for operator-level sharing (e.g., across operators). For example, portion 208 may be used to send a reservation response signal from, for example, a BS in Operator A's network for an BS in Operator B's network. The portions 209 are used for transmitting reservation response signals 224 for link-level sharing (e.g., between UL and DL) within an operator (e.g., among network operating entities associated with the operator). For example, portion 209 may be used to send an RRS signal from one BS for another BS within an operator's network. An RRS may generally be referred to as a link sharing or link sensing message or signal. Each of the reservation response signals 222 and 224 may include a predetermined preamble sequence or a clear-to-send (CTS) signal. The CCA periods 204 can be arranged in a decreasing order of priorities. Thus, a low-priority operator node can monitor the channel (e.g., the shared frequency band 201) in the CCA periods 204 of higher priorities. Upon detection of a reservation from a high-priority operator node, the low-priority operator node may refrain from transmitting in the following transmission period 206. The gap period 219 allows low-priority operator nodes to process the reservation of a higher priority operator. The gap period 217 in a CCA period 204 allows for processing and/or UL/DL switching time.

The transmission period 206 can include a DL control portion 210, a data portion 212, and a UL control portion 214. The DL control portion 210 is used for transmitting DL controls 230 (e.g., UL or DL triggers) for the data portion 212 and/or the UL control portion 214. The data portion 212 is used for transmitting UL or DL data 232 based on a corresponding DL control 230. The UL control portion 214 is used for transmitting UL controls 234 (e.g., scheduling request (SR) and hybrid automatic repeat request (HARQ) information).

As an example, Operator A has priority over Operator B in the particular TXOP 202. As such, the high-priority CCA period 204a may be assigned to Operator A and the low-priority CCA period 204b is assigned to Operator B. The pattern-filled boxes shown with respect to the primary user and the secondary user in FIG. 2 represent signal transmissions. The dashed-outline boxes at the top of FIG. 2 are included as references to the TXOP structure 205 without signal transmission.

For operator-level sharing, a BS of Operator A may transmit an RRQ signal 220a in the portion 207 of the CCA period 204a to reserve the following transmission period 206. The RRQ signal 220a may include a trigger for a UE. A target receiver corresponding to the trigger may transmit an reservation response signal 222a in the portion 208 of the CCA period 204a to silence lower-priority operators (e.g., Operator B). When the trigger is a DL trigger, the UE is the target receiver. Conversely, when the trigger is a UL trigger, the BS is the target receiver. Subsequently, the Operator A BS may communicate a DL control 230a, data 232a, and a UL control 234a with the triggered UE in the following transmission period 206.

Operator B (e.g., the low-priority operator) may monitor the CCA period 204a for an RRQ signal 220a and/or a reservation response signal 222a from Operator A (e.g., the high-priority operator). Upon detection of an RRQ signal 220a and/or a reservation response signal 222a from the high-priority Operator A, Operator B nodes may yield spectrum access to Operator A. However, when the shared frequency band 201 is not reserved by Operator A, Operator B may opportunistically access the transmission period 206 of the TXOP 202 using similar mechanisms as Operator A. For example, a BS of Operator B may transmit RRQ signal 220b in the portion 207 of the assigned CCA period 204b to trigger a UE for a communication in the transmission period 206. A target receiver identified in the trigger may transmit a reservation response signal 222b in the portion 208 of the CCA period 204b when there are lower priority operator nodes. When the trigger is a DL trigger, the target receiver is the UE. When the trigger is a UL trigger, the target receiver is the BS. Subsequently, the Operator B BS may communicate a DL control 230b, data 232b, and/or a UL control 234b with the triggered UE in the transmission period 206.

For link-level sharing (e.g., link sharing) within Operator A or Operator B, Operator A or Operator B may use substantially similar reservation mechanisms as in the operator-level sharing. For example, DL may have priority over UL in the TXOP 202. A target receiver of the high-priority link direction (e.g., a default link direction) may transmit a reservation response signal 224 in the portion 209 of a corresponding CCA period 204 to silence nodes of the low-priority link direction (e.g., a link direction switched from the default link direction). In addition, dynamic TDD may be applied to switch the prioritized link direction in the TXOP 202, for example, from DL to UL. Further, the transmission period 206 may be further divided into sub-periods and dynamic TDD may be applied per sub-period. Mechanisms for performing dynamic TDD are described in greater detail herein.

Figure 3:
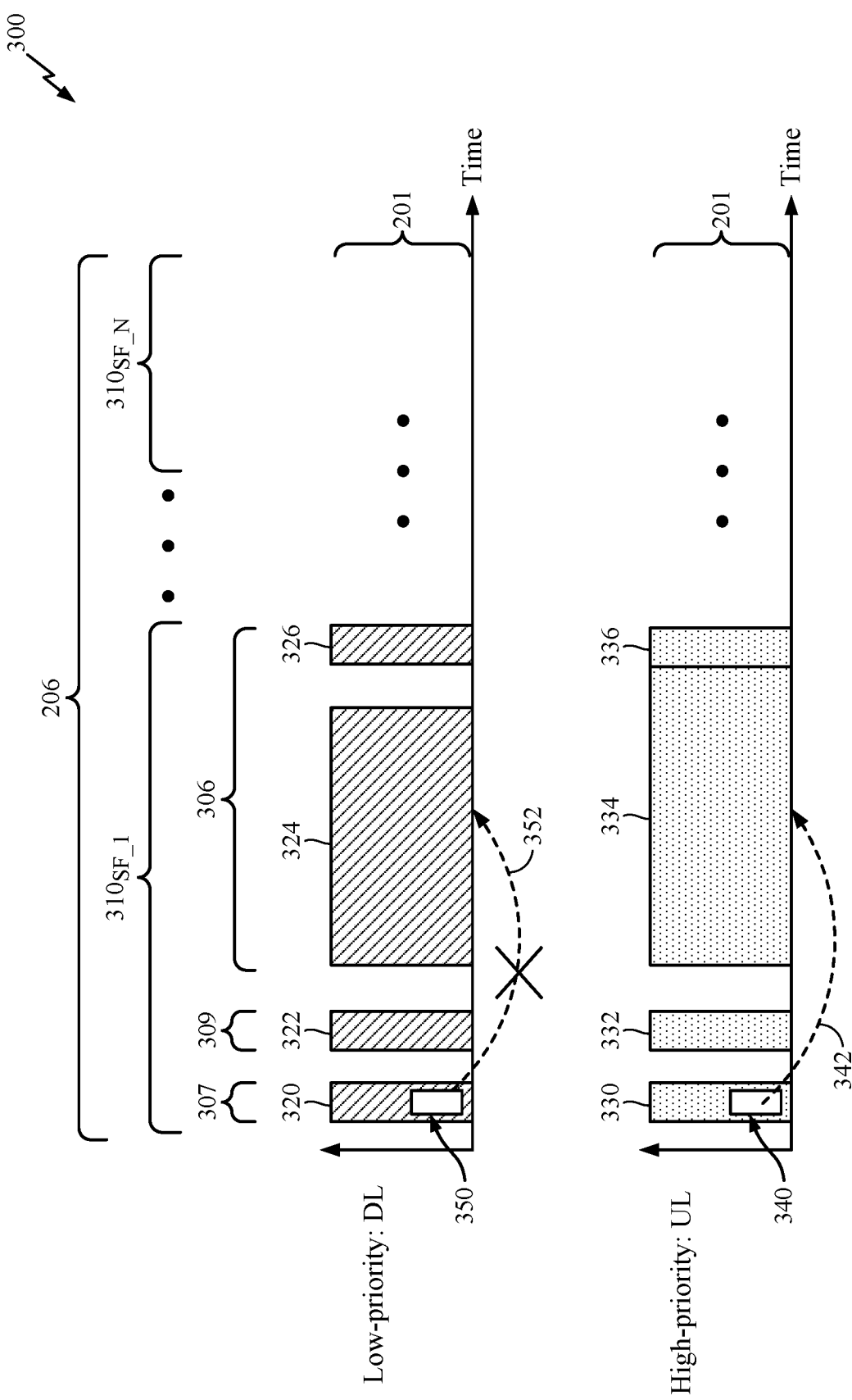
FIG. 3 illustrates a dynamic time-division duplexing (TDD) scenario in accordance with various aspects of the present disclosure.
Figure 4:
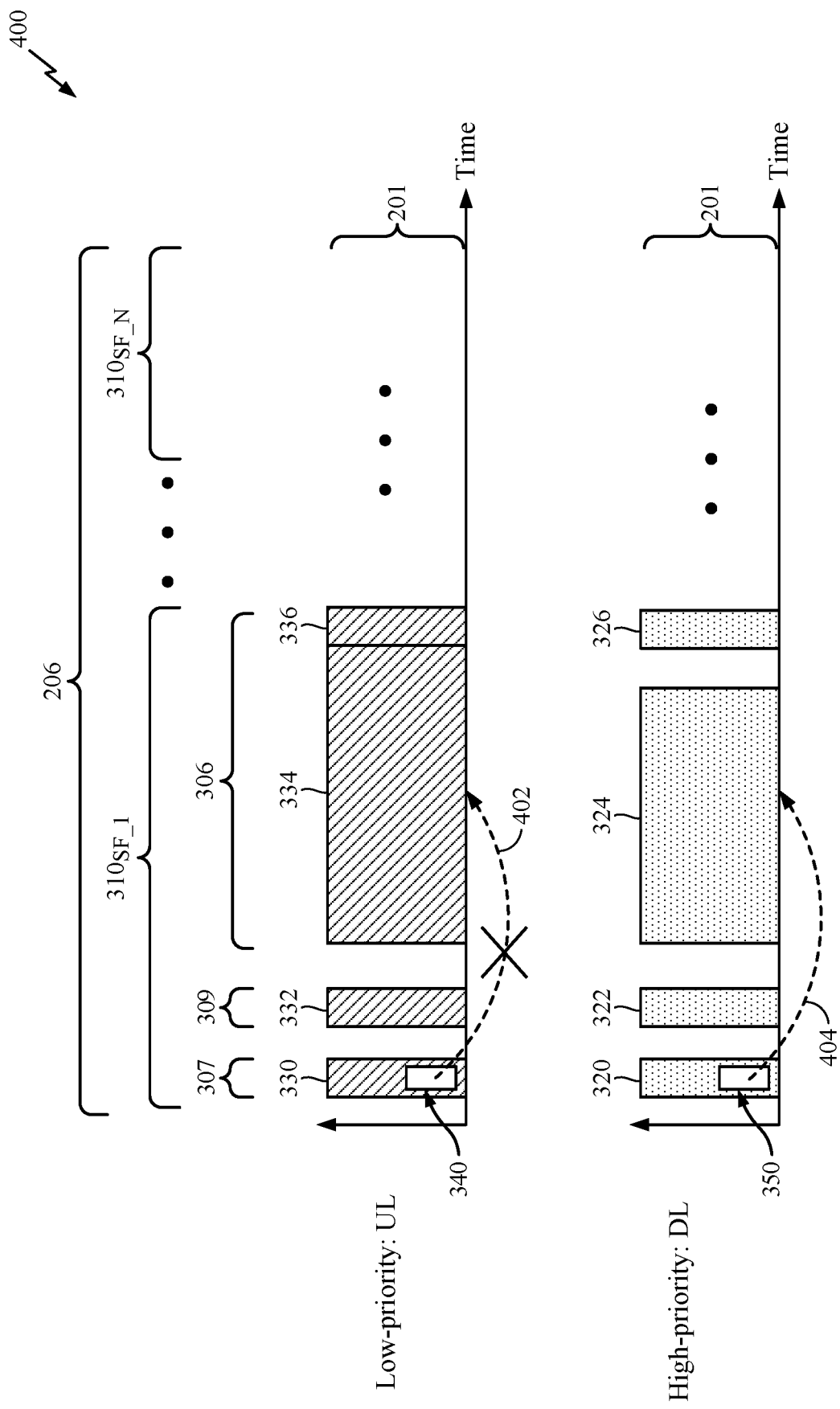
FIG. 4 illustrates a dynamic TDD scenario in accordance with various aspects of the present disclosure.

FIGS. 3 and 4 illustrates further interference control in dynamic TDD based on the link-level sharing mechanisms in the scheme 200 described above with respect to FIG. 2. In FIGS. 3 and 4, the x-axes represent time in some constant units and the y-axes represent frequency in some constant units.

FIG. 3 illustrates a dynamic TDD scenario 300 in accordance with various aspects of the present disclosure. In the scenario 300, the transmission period 206 is time-partitioned into a plurality of sub-periods 310 shown as $310_{SF\_1}$ to $310_{SF\_N}$. Each sub-period 310 can be a self-contained sub-frame. For example, a BS 105 may communicate with a UE 115 in each sub-period 310. In some instances, each sub-period 310 may have a duration between about 500 microseconds (μs) to about 1 ms. Each sub-period 310 can be assigned with a default link direction for data communication. Dynamic TDD may be applied to dynamically change a link priority in each sub-period 310 using similar link-level sharing mechanisms as in the scheme 200.

As an example, in the sub-period $310_{SF\_1}$, the high-priority link is UL and the low-priority link is DL. A UL-granting BS transmits an RRQ signal 330 (e.g., the RRQ signal 220) during a portion 307 (e.g., the portion 207) of the sub-period $310_{SF\_1}$. In some instances, the RRQ signal 330 may be similar to an LTE physical downlink control channel (PDCCH) signal. An LTE PDCCH signal may carry one or more transmission grants for one or more UEs. The transmission grants may be formatted according to LTE downlink control indicator (DCI) formats, which indicate resource blocks (e.g., frequency resources), MCS, and/or other transmission configuration parameters assigned to corresponding transmission grants. The RRQ signal 330 includes a UL transmission grant 340 for the UL-scheduled UE in a following portion 306 of the sub-period $310_{SF\_1}$. The UL transmission grant 340 may include scheduling information such as a modulation coding scheme (MCS), a subband allocation, a transmission rank, and/or pre-coding parameters. The UL-granting BS (e.g., the target receiver) transmits a reservation response signal 224, such as a shared media or resource reservation signal RRS 332 during a portion 309 (e.g., the portion 209) of the sub-period $310_{SF1}$ to silence nodes of the low-priority link (e.g., DL). Subsequently, the UL-scheduled UE transmits UL data 334 (e.g., the data 232) and a UL control 336 (e.g., the UL controls 234) to the UL-granting BS during a portion 306 of the sub-period $310_{SF1}$. The UL data 334 and the UL control 336 are transmitted according to the UL transmission grant 340 as shown by the dashed arrow 342.

For dynamic TDD, a DL-granting BS transmits an RRQ signal 320 during the same portion 307 of the sub-period $310_{SF\_1}$. The RRQ signal 320 may be similar to the RRQ signals 220 and 330. The RRQ signal 320 indicates a DL transmission grant 350 for the DL-scheduled UE in the portion 306. The DL transmission grant 350 may include scheduling information similar to the UL transmission grant 340. The DL-scheduled UE (e.g., the target receiver) may transmit reservation response signal 224, such as RRS 322 during the portion 309 to silence low-priority operator nodes. In some embodiments, the RRS 322 and RRS 332 may be transmitted in different subbands of the frequency band 201.

The DL-granting BS (e.g., the low-priority link) may monitor for an RRS 332, for example, from the high-priority link (e.g., the UL) to determine whether the link direction can be switched. When no RRS 332 is detected, the DL-granting BS may proceed to transmit DL data 324 to the DL-scheduled UE and the DL-scheduled UE may transmit a UL control 326 according to the DL transmission grant 350. However, upon detection of an RRS 332 from the high-priority link, the DL-granting BS may yield spectrum access to the high-priority link.

In some embodiments, the DL-granting BS may determine that the receive signal strength of the RRS 332 is sufficiently low, indicating that the high-priority receiver may be substantially far away from the DL-granting BS. Thus, the DL-granting BS may determine that a transmission from the DL-granting BS may not have a significant interference impact on the high-priority UL communication and proceed with the scheduled DL transmission.

Alternatively, the DL-granting BS may determine the receive signal strength of the RRS 332 may be relatively strong, indicating that the high-priority receiver may be relatively close to the DL-granting BS. To improve spectrum utilization efficiency, the DL-granting BS may modify the DL schedule instead of completely yielding access to the high-priority UL communication. For example, the DL-granting BS may reduce the transmit power and/or modify other transmission parameters based on the detection to reduce and/or minimize interference impact on the UL communication (e.g., the UL data 334 and the UL control 336) and continue with the transmission of the DL data 324. Thus, the transmission of DL data 324 may not match the initial DL transmission grant 350 as shown by the dashed arrow 352 with the cross. However, the DL-scheduled UE has no knowledge of the yielding and/or the DL schedule change, and thus may rely on blind detection to detect and decode the DL data 324.

FIG. 4 illustrates a dynamic TDD scenario 400 in accordance with various aspects of the present disclosure. The scenario 400 is substantially similar to the scenario 300. However, in the scenario 400, the high-priority link in the sub-period $310_{SF\_1}$ is DL instead of UL as in the scenario 300. In the scenario 400, a DL-granting BS and a UL-granting BS may schedule a DL communication and a UL communication, respectively, using similar mechanisms as in the scheme 200 and the scenario 300. The communication (e.g., the DL data 324 and the UL control 326) over the high-priority link (e.g., DL) may proceed according to the initial DL transmission grant 350 as shown by the dashed arrow 404. Similar to the scenario 300, the communication (e.g., the UL data 334 and the UL control 336) over the low-priority link (e.g., UL) may proceed without yielding, but the scheduling or transmission parameters may be modified such that the interference impact on the high-priority DL communication may be minimized. Thus, the transmission of UL data 334 may not match the initial UL transmission grant 340 as shown by the dashed arrow 402 with the cross. The UL-granting BS may have no knowledge of the scheduling adjustment, and thus may rely on blind detection to detect and decode the UL data 334.

While the low-priority receivers in the scenarios 300 or 400 may apply blind detection for the data reception or detection, blind detection may be complex and may not be accurate in some instances. To facilitate the schedule adjustment, the target transmitter may signal the updated schedule prior to the transmission, as described in greater detail herein.

Figure 5:
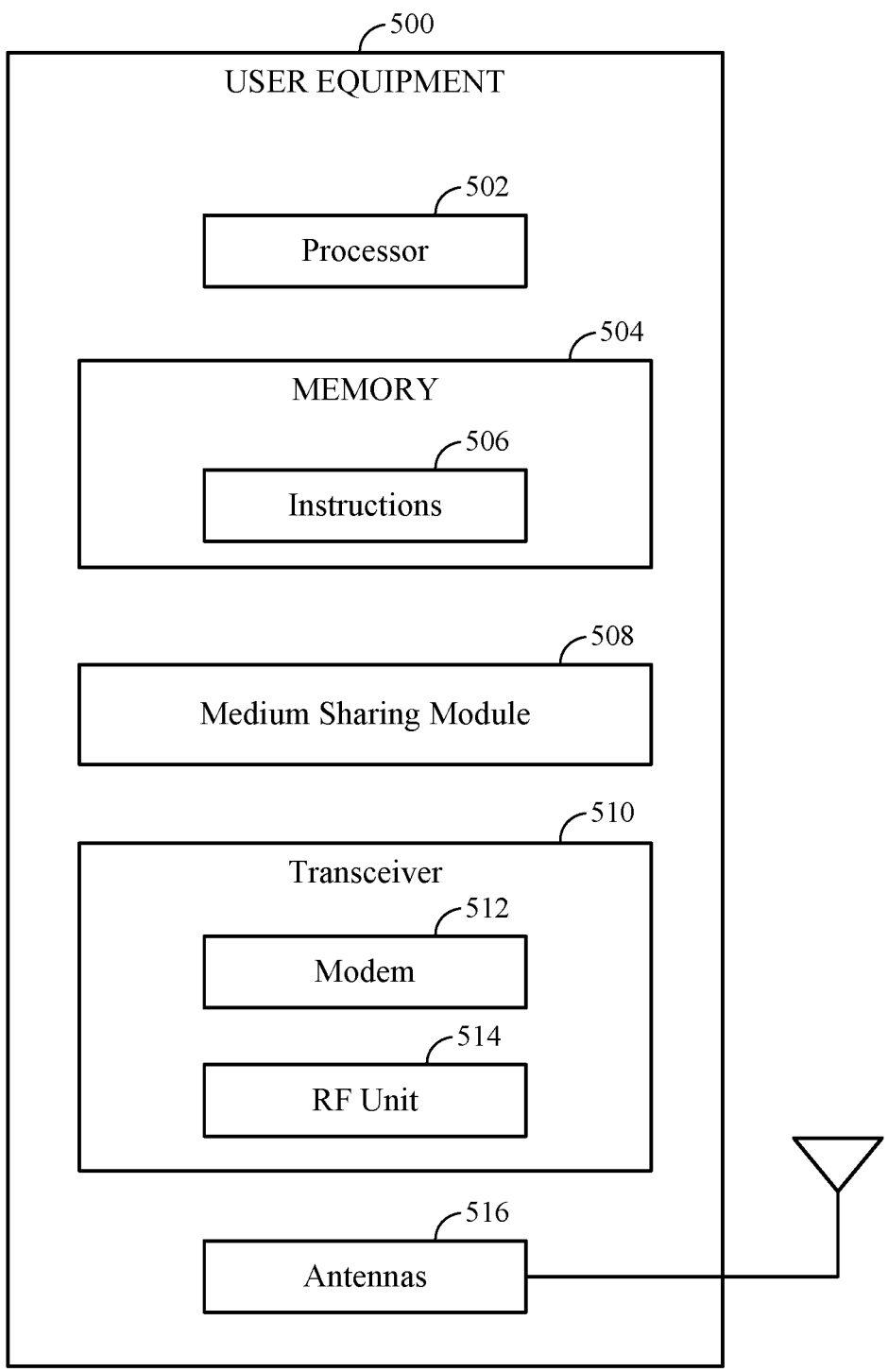
FIG. 5 is a block diagram of an exemplary user equipment (UE) in accordance with various aspects of the present disclosure.

FIG. 5 is a block diagram of an exemplary UE 500 in accordance with various aspects of the present disclosure. The UE 500 may be a UE 115 as discussed above. As shown, the UE 500 may include a processor 502, a memory 504, a medium sharing module 508, a transceiver 510 including a modem subsystem 512 and a radio frequency (RF) unit 514, and one or more antennas 516. These elements may be in direct or indirect communication with each other, for example via one or more buses.

The processor 502 may include a central processing unit (CPU), a digital signal processor (DSP), an application-specific integrated circuit (ASIC), a controller, a field programmable gate array (FPGA) device, another hardware device, a firmware device, or any combination thereof configured to perform the operations described herein. The processor 502 may also be implemented as a combination of computing devices, e.g., a combination of a DSP and a microprocessor, a plurality of microprocessors, one or more microprocessors in conjunction with a DSP core, or any other such configuration.

The memory 504 may include a cache memory (e.g., a cache memory of the processor 502), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, phase change memory, solid state memory device, hard disk drives, other forms of volatile and non-volatile memory, or a combination of different types of memory. In an embodiment, the memory 504 includes a non-transitory computer-readable medium. The memory 504 may store instructions 506. The instructions 506 may include instructions that, when executed by the processor 502, cause the processor 502 to perform the operations described herein with reference to the UEs 215 in connection with embodiments of the present disclosure. Instructions 506 may also be referred to as code. The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may include a single computer-readable statement or many computer-readable statements.

The medium sharing module 508 may be used for various aspects of the present disclosure. For example, the medium sharing module 508 is configured to identify TXOPs in a shared medium, perform medium sensing, receive scheduling information for UL and/or DL communications, perform dynamic TDD, determine updates for UL scheduling information during link-priority switching, and/or monitor for updated DL scheduling information during link-priority switching, as described in greater detail herein.

As shown, the transceiver 510 may include the modem subsystem 512 and the RF unit 514. The transceiver 510 can be configured to communicate bi-directionally with other devices, such as the BSs 105 and 305. The modem subsystem 512 may be configured to modulate and/or encode the data from the memory 504 and/or the medium sharing module 508 according to a modulation and coding scheme (MCS), e.g., a low-density parity check (LDPC) coding scheme, a turbo coding scheme, a convolutional coding scheme, a digital beamforming scheme, etc. The RF unit 514 may be configured to process (e.g., perform analog to digital conversion or digital to analog conversion, etc.) modulated/encoded data from the modem subsystem 512 (on outbound transmissions) or of transmissions originating from another source such as a UE 115 or a BS 105. The RF unit 514 may be further configured to perform analog beamforming in conjunction with the digital beamforming. Although shown as integrated together in transceiver 510, the modem subsystem 512 and the RF unit 514 may be separate devices that are coupled together at the UE 215 to enable the UE 215 to communicate with other devices.

The RF unit 514 may provide the modulated and/or processed data, e.g. data packets (or, more generally, data messages that may contain one or more data packets and other information), to the antennas 516 for transmission to one or more other devices. This may include, for example, transmission of RRS, and/or reference signals, such as SRSs, according to embodiments of the present disclosure. The antennas 516 may further receive data messages transmitted from other devices. The antennas 516 may provide the received data messages for processing and/or demodulation at the transceiver 510. The antennas 516 may include multiple antennas of similar or different designs in order to sustain multiple transmission links. The RF unit 514 may configure the antennas 516. In aspects, one or more of any of the components of the UE 500 may perform dynamic TDD as described herein.

Figure 6:
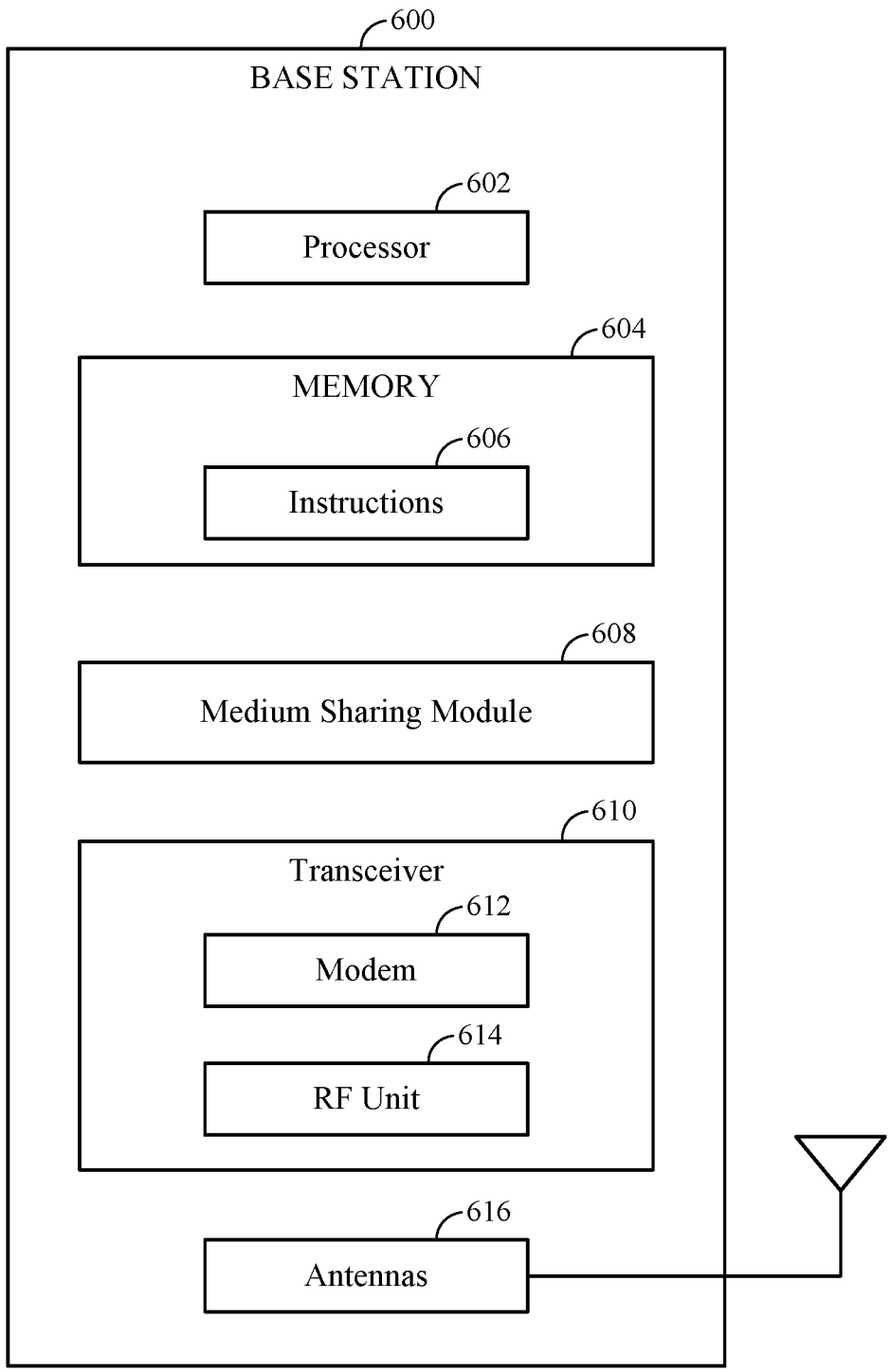
FIG. 6 is a block diagram of an exemplary base station (BS) in accordance with various aspects of the present disclosure.

FIG. 6 is a block diagram of an exemplary BS 600 in accordance with various aspects of the present disclosure. The BS 600 may be a BS 105 as discussed above. A shown, the BS 600 may include a processor 602, a memory 604, a medium sharing module 608, a transceiver 610 including a modem subsystem 612 and a RF unit 614, and one or more antennas 616. These elements may be in direct or indirect communication with each other, for example via one or more buses.

The processor 602 may have various features as a specific-type processor. For example, these may include a CPU, a DSP, an ASIC, a controller, a FPGA device, another hardware device, a firmware device, or any combination thereof configured to perform the operations described herein. The processor 602 may also be implemented as a combination of computing devices, e.g., a combination of a DSP and a microprocessor, a plurality of microprocessors, one or more microprocessors in conjunction with a DSP core, or any other such configuration.

The memory 604 may include a cache memory (e.g., a cache memory of the processor 602), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some embodiments, the memory 604 may include a non-transitory computer-readable medium. The memory 604 may store instructions 606. The instructions 606 may include instructions that, when executed by the processor 602, cause the processor 602 to perform operations described herein. Instructions 606 may also be referred to as code, which may be interpreted broadly to include any type of computer-readable statement(s) as discussed above with respect to FIG. 6.

The medium sharing module 608 may be used for various aspects of the present disclosure. For example, the medium sharing module 608 is configured to identify TXOPs in a shared spectrum, perform medium sensing, determine scheduling information for UL and/or DL communications, perform dynamic TDD, determine updates for DL scheduling information during link-priority switching, and/or monitor for updated UL scheduling information for link-priority switching, as described in greater detail herein.

As shown, the transceiver 610 may include the modem subsystem 612 and the RF unit 614. The transceiver 610 can be configured to communicate bi-directionally with other devices, such as the UEs 115 and 215 and/or another core network element. The modem subsystem 612 may be configured to modulate and/or encode data according to a MCS, e.g., a LDPC coding scheme, a turbo coding scheme, a convolutional coding scheme, a digital beamforming scheme, etc. The RF unit 614 may be configured to process (e.g., perform analog to digital conversion or digital to analog conversion, etc.) modulated/encoded data from the modem subsystem 612 (on outbound transmissions) or of transmissions originating from another source such as a UE 115. The RF unit 614 may be further configured to perform analog beamforming in conjunction with the digital beamforming. Although shown as integrated together in transceiver 610, the modem subsystem 612 and the RF unit 614 may be separate devices that are coupled together at the BS 105 to enable the BS 105 to communicate with other devices.

The RF unit 614 may provide the modulated and/or processed data, e.g. data packets (or, more generally, data messages that may contain one or more data packets and other information), to the antennas 616 for transmission to one or more other devices. This may include, for example, transmission of information to complete attachment to a network and communication with a camped UE 115 according to embodiments of the present disclosure. The antennas 616 may further receive data messages transmitted from other devices and provide the received data messages for processing and/or demodulation at the transceiver 610. The antennas 616 may include multiple antennas of similar or different designs in order to sustain multiple transmission links. In aspects, one or more of any of the components of the BS 600 may perform dynamic TDD as described herein.

Figure 7:
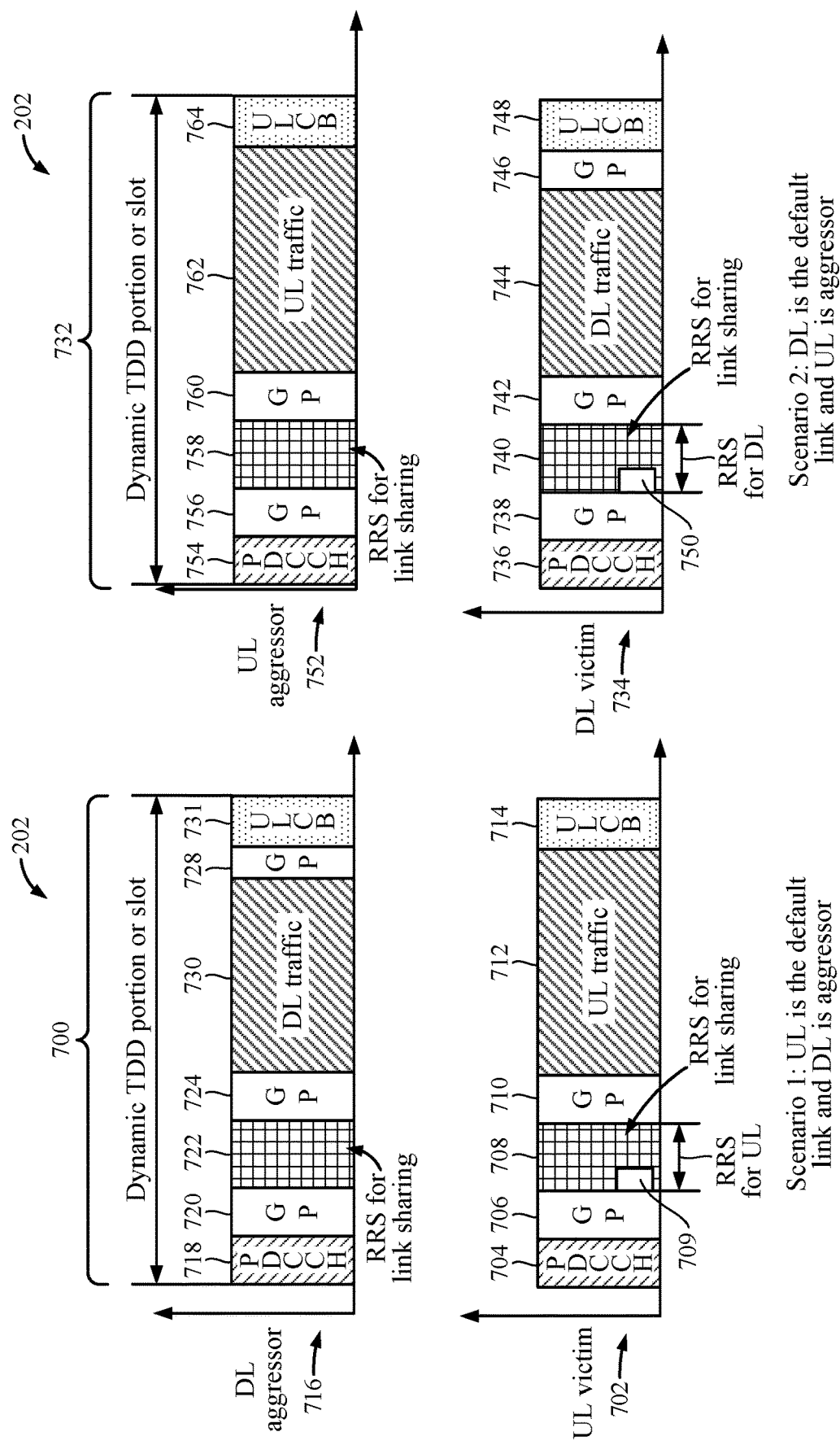
FIG. 7A-B illustrates dynamic TDD scenarios having a downlink (DL) and uplink (UL) aggressor, respectively.

FIGS. 7A-B illustrate dynamic TDD scenarios having a downlink (DL) and uplink (UL) aggressor, respectively. In FIGS. 7A-B, the x-axes represent time in some constant units and the y-axes represent frequency in some constant units. In the scenario of FIG. 7A, for example, a sub-period 700, 310 of a transmission period 206 of a TXOP 202 is shown. For example, a BS 105 may communicate with a UE 115 in the sub-period 700, 310. The sub-period 700 is assigned with a default link communication direction (e.g., for data communication) of uplink. The sub-period 700, 310 can be or include a self-contained subframe 702. Self-contained subframe 702 illustrates a self-contained subframe employed for a communication between a first UE 115a and a first BS 105a, for example. The self-contained subframe 702 may include a PDCCH portion 704 including control information providing at least information regarding a grant of uplink resources to a UE 115a, a first guard period 706 to provide the UE 115a time to process the PDCCH portion, an RRS symbol 708 to allow BS 105a signaling to reserve this sub-period for uplink communication, a second guard period 710 to provide the BS 105b time for processing associated with RRS symbol 708 where BS 105b is the low priority DL-granting BS and an uplink control portion (e.g., an uplink control block (ULCB)) 714 by which the UE 115a may provide uplink control information to the first BS 105a. During the RRS symbol 708, the first BS 105a which is an UL-granting BS (e.g., a target receiver) transmits an RRS 709 to silence one or more nodes of a low-priority link communication direction (e.g., downlink in this example if the uplink is the high-priority link). During the RRS symbol 708, the second BS 105b which is an DL-granting BS (e.g., a potential aggressor) monitors the RRS signal 709 and determines whether it needs to back off its DL transmission or not. A high priority receiver sends RRS in the RRS symbol, while the low priority transmitter monitors RRS in the RRS symbol. However, dynamic TDD may be applied to dynamically change a link communication direction in a sub-period 700 using similar link-level sharing mechanisms as in the scheme 200.

For example, the sub-period 700, 310 can be or include a self-contained subframe 716 employed for a communication, for example, from a second BS 105b to the first UE 115a or another UE 115b. The self-contained subframe 716 may provide a PDCCH portion 718 including control information providing at least information regarding a grant of downlink resources, a first guard period 720 to provide such UE time to process the PDCCH portion, an RRS symbol 722 to allow BS 105a (e.g., the high priority target receiver) signaling to reserve this sub-period for downlink communication, a second guard period 724 to provide BS 105b time for processing RRS symbol 724 for preparing to transmit downlink traffic portion 726 of the self-contained subframe 716, a third guard period 728 to provide switching time between receiving a downlink traffic portion 730 of the self-contained subframe 716 and transmitting an uplink control portion (e.g., an uplink control block (ULCB)) 730 of the self-contained subframe 716 to the DL-granting second BS 105b. For dynamic TDD, a DL-granting BS (e.g., the low-priority link communication direction) may monitor for an RRS 709 during the RRS symbol 722 (e.g., which coincides with RRS symbol 708), for example, from the high-priority link (e.g., the UL) to determine whether the link direction can be switched. When no RRS 709 is detected, the DL-granting BS 105b may proceed to transmit DL traffic to the DL-scheduled UE and the DL-scheduled UE may transmit UL control information via the uplink control portion (e.g., an uplink control block (ULCB)) 731 according to the DL transmission grant. However, upon detection of an RRS 709 from the high-priority link, the DL-granting BS may yield spectrum access to the high-priority link.

Similarly, in the scenario of FIG. 7B, for example, a sub-period 732, 310 of a transmission period 206 of a TXOP 202 is shown. For example, a BS 105 may communicate with a UE 115 in the sub-period 732, 310. The sub-period 732 is assigned with a default link direction for data communication of downlink. The sub-period 732, 310 can be or include a self-contained subframe 734. Self-contained subframe 734 illustrates a self-contained subframe employed for a communication between a first UE 115a and a first BS 105a, for example. The self-contained subframe 734 may include a PDCCH portion 736 including control information providing at least information regarding a grant of downlink resources to a UE 115a, a first guard period 738 to provide the UE 115a time to process the PDCCH portion, an RRS symbol 740 to allow UE 115a signaling to reserve medium access for downlink communication, a second guard period 742 to provide the UE 115b time for processing associated with RRS symbol 740/preparing to receive a downlink traffic portion 744 of the self-contained subframe 734, a third guard period 746 to provide switching time between receiving downlink traffic portion 744 of the self-contained subframe 734 and transmitting an uplink control portion (e.g., an uplink control block (ULCB)) 748 of the self-contained subframe 734 to the DL-granting first BS 105a. During the RRS symbol 740, the first UE 115a which is a DL-granted UE (e.g., a target receiver) transmits an RRS 750 to silence one or more nodes of a low-priority link (e.g., uplink in this example if the downlink is the high-priority link) while the second UE 115b which is a potential aggressor monitors the RRS to determine whether it needs to back off or not. However, dynamic TDD may be applied to dynamically change a link direction in a sub-period 732 using similar link-level sharing mechanisms as in the scheme 200.

For example, the sub-period 732, 310 can be or include a self-contained subframe 752 employed for a communication, for example, from a second BS 105b to another UE 115b. The self-contained subframe 752 may provide a PDCCH portion 754 including control information providing at least information regarding a grant of uplink resources, a first guard period 756 to provide such UE time to process the PDCCH portion, an RRS symbol 758 to allow UE 115a signaling to reserve medium access for uplink communication, a second guard period 760 to provide UE 115b time to process the RRS signaling sent from UE 115a of the self-contained subframe 752 for transmission, and an uplink control portion (e.g., an uplink control block (ULCB)) 764 of the self-contained subframe 752 to the UL-granting second BS 105b. For dynamic TDD, a UL-granted UE 115b (e.g., the low-priority communication direction link) may monitor for an RRS 750 during the RRS symbol 758 (e.g., which coincides with RRS symbol 740), for example, from the high-priority link communication direction (e.g., the DL) to determine whether the link direction can be switched. When no RRS 750 is detected, the UL-scheduled UE 115b may proceed to transmit UL traffic to the second BS 105b and the UL-scheduled UE 115b may transmit UL control information via the uplink control portion (e.g., an uplink control block (ULCB)) 764 according to the UL transmission grant. However, upon detection of an RRS 750 from the high-priority link communication direction, the UL-scheduled UE 115b may yield spectrum access to the high-priority link.

In this manner, a transmission period 206 and/or one or more sub-periods 700 included therein of a TXOP 202 may be flexible. For example, a direction of communication for a link may be dynamically changed during such transmission period 206 and/or for one or more sub-periods 700 included therein. However, dynamic TDD for such period or sub-periods based on RRS has an associated overhead cost. For example, as shown in FIGS. 7A-7B, for each flexible period or sub-period 700, 732, a receiver of the high priority communication direction for a link needs processing and/or switching time to decode PDCCH and to send an RRS during the symbol 722. Furthermore, for each flexible period or sub-period 700, 732, the transmitter of the low priority communication direction for the link needs processing and/or switching time for an RRS during the symbol 758 and/or any transmission based thereon. Thus, each such period or sub-period includes guard periods and an RRS symbol which reduces an amount of resources remaining for traffic communication (e.g., data traffic communication) between a UE and a BS. For convenience, a period or sub-period may be referred to herein as a portion or, for example, slot. However, for such dynamic TDD, for example, in NR, in each flexible TDD portion or slot, a gNB sends PDCCH with either DL or UL grant, a receiver with high priority link sends reservation signal (RRS), and a transmitter with low priority link monitors the RRS from the high priority link and decides on transmission yielding or not. Although such RRS-based dynamic TDD allows each gNB to switch the link in each flexible TDD portion or slot, however, one concern is that such RRS-based portion or slot level dynamic TDD may incur too much overhead. More specifically, in each flexible portion or slot, the receiver of the high priority link needs processing time to decode PDCCH and sends RRS accordingly. Furthermore, a transmitter of the low priority link needs processing time to process RRS and transmits accordingly. This overhead becomes even more severe with the self-contained portion or slot structure where there is guard period needed between DL traffic and UL control The present methods and apparatus provide improved methods for dynamic TDD, for example, by reducing link sharing overhead for a transmission opportunity. In aspects, link sharing guard period and RRS symbol overhead associated with each portion or slot of a transmission opportunity are avoided by placing link sharing guard period and RRS symbol overhead in one or more portions or slots of a transmission opportunity, such as the first one or two portions or slots of the transmission opportunity, so subsequent portions or slots of the transmission opportunity to not have to include such overhead.

Figure 8:
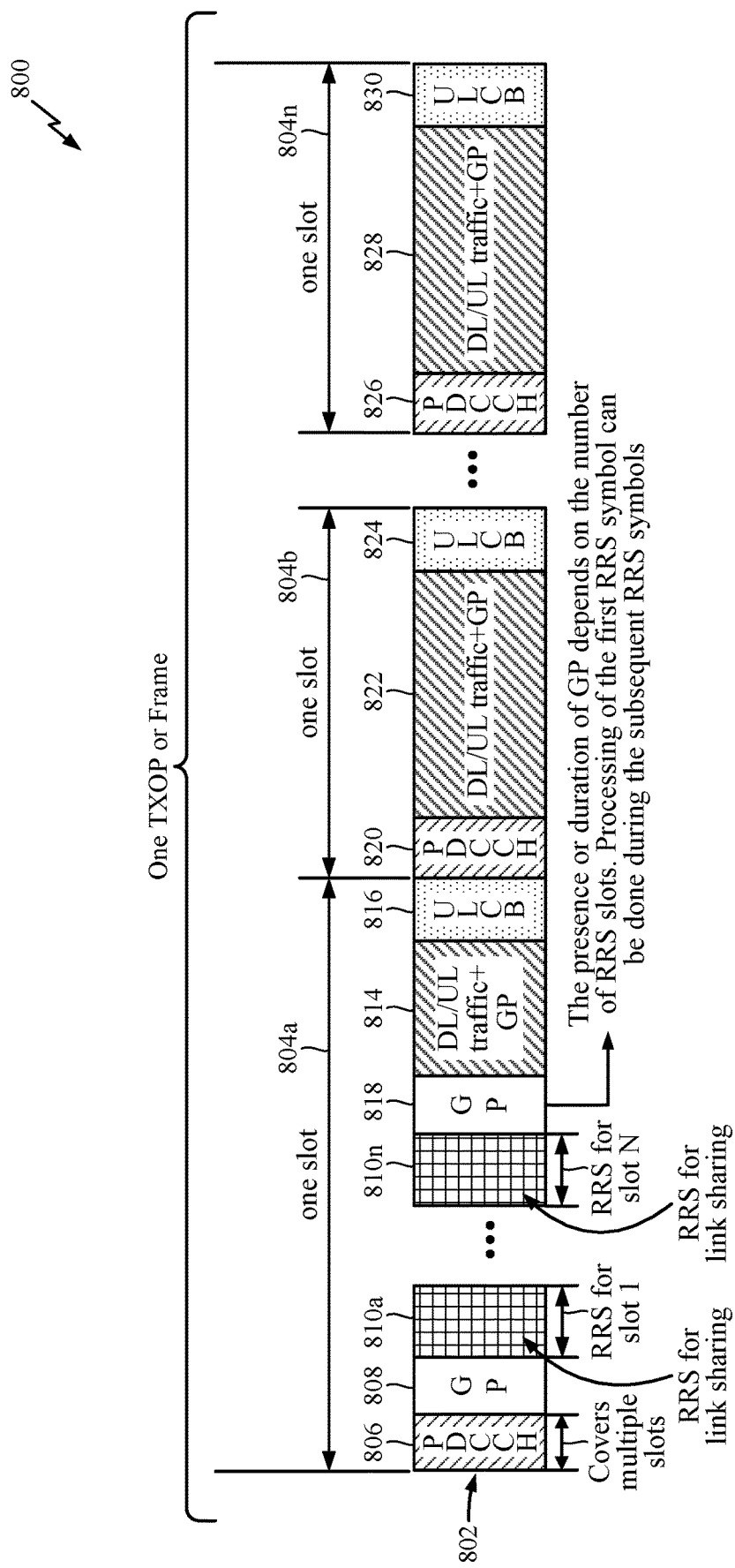
FIG. 8 illustrates a dynamic TDD signaling scheme in accordance with various aspects of the present disclosure.

FIG. 8 illustrates a dynamic TDD signaling scheme 800 in accordance with various aspects of the present disclosure. According to the dynamic TDD signaling scheme 800, a transmission opportunity 802 may include a plurality of portions or slots 804a, 804b, 804n. For example, a first wireless communication device, such as a BS 105 or UE 115, may communicate with a second wireless communication device, such as a UE 115 or BS 105, in the one or more of the plurality of portions or slots 804a, 804b, 804n. In aspects, each portion or slot 804 may represent a self-contained subframe. A portion or slot 804 is assigned with a default link direction for data traffic communication. Such default link direction for traffic communication may be known to network operators and/or nodes of the network. For example, a first portion or slot 804a (enlarged in FIG. 8 for clarity) of the transmission opportunity 802 may include a PDCCH portion 806 including control information to trigger RRS(s) transmission or RRS(s) monitoring during the first portion or slot 804a where the triggering RRS transmission or RRS monitoring is associated with the plurality of portions or slots 804a, 804b, ... 804n, respectively, a first guard period 808, a plurality of RRS symbols 810a, 810b (not shown), ... 810n associated with the plurality of portions or slots 804a, 804b, ... 804n, respectively, an uplink or downlink traffic and one or more associated guard periods 814 of the self-contained subframe and an uplink control portion (e.g., an uplink control block (ULCB)) 816. The PDCCH portion 806 may include a grant of downlink or uplink resources for the first portion or slot 804a for the receiving wireless communication device UE 115. The first guard period 808 provides and/or accounts for processing time and/or switching time (e.g., at least associated with the control information triggering RRS(s) transmission or RRS(s) monitoring, and RRS(s) transmission or monitoring). During an RRS symbol 810a, 810b, ... 810n, an RRS may be communicated. For example, a wireless communication device serving as a target high priority receiver during the associated portion or slot 804a, 804b, ... 804n may transmit an RSS during the RRS symbol 810a, 810b, 810n. A wireless communication device serving as a target low priority transmitter during the associated portion or slot 804a, 804b, ... 804n may monitor for an RSS during the RRS symbol 810a, 810b, ... 810n. In this manner, the wireless communication device 115 receiving the PDCCH portion 806 including control information triggering transmission of or monitoring for an RSS during the first portion or slot 804a may send or monitor for an RSS 1 in one or more of the plurality of RRS symbols 810a, 810b, ... 810n to improve medium sharing throughout the transmission opportunity. Furthermore, a node targeting transmission (e.g., in a switched link communication direction) during a portion or slot 804a, 804b, . . . 804n of the transmission opportunity 802 may monitor for an RSS signal during the associated RRS symbol 810 or portion thereof. In aspects, an RRS symbol may be configured to account for time for the wireless communication device 115 to switch at least from receiving to transmitting, or vice versa. Additionally or alternatively, the first portion or slot 804a may include a guard period after an RRS symbol, such as 810a or 810b, to account for such switching time. However, it is expected that such guard period is significantly smaller than the RRS monitoring time.

In aspects, first portion or slot 804a may include second guard period 818 after the plurality of RRS symbols 810a, 810b, . . . 810n to provide and/or account for processing of an RRS during RRS symbol 810a associated with the first portion or slot 804a. The presence and/or duration of the second guard period 818 may be based on a number of the plurality of RRS symbols 810a, 810b, . . . 810n in the first portion or slot 804a. For example, if RRS symbol 810a may be processed during one or more of the remaining RRS symbols 810b, . . . 810n the second guard period 818 may not be used.

The transmission opportunity 802 may include a second portion or slot 804b including a PDCCH portion 820, an uplink or downlink traffic and one or more associated guard periods portion 822, and an uplink control portion (e.g., an uplink control block (ULCB)) 824. The PDCCH portion 820 may include a grant of downlink or uplink resources for the second portion or slot 804b for the receiving wireless communication device 115. The wireless communication device 115 communicates with a BS 105 during the uplink or downlink traffic and one or more associated guard periods portion 822 based on the grant in the PDCCH portion 820. The one or more associated guard periods may provide for communication direction switching time and/or processing time. In aspects, a guard period may at least precede the uplink or downlink traffic for an uplink transmission by the wireless communication device. In aspects, a guard period may at least follow the uplink or downlink traffic for a downlink transmission. The uplink control portion 824 is for transmitting UL control information. Similarly, the transmission opportunity 802 may include an nth portion or slot 804n including a PDCCH portion 826, an uplink or downlink traffic and one or more associated guard periods portion 828, and an uplink control portion (e.g., an uplink control block (ULCB)) 830. In this manner, the first portion or slot 804a may employ cross-portion or slot link sharing signaling to resolve potential link sharing issue the plurality of portions or slots 804a, 804b, 804n of the transmission opportunity. portions or slots 804b, 804n subsequent the first portion 804a may avoid link sharing overhead associated with portion- or slot-level link sharing signaling schemes. For example, portions 804b, 804n avoid the processing and switching time before and after an RRS symbol associated with portion- or slot-level link sharing signaling schemes, for example described with reference to FIGS. 7A-B. Thus, as described above, the RRSs for a dynamic TDD portion or slot can be TDMed. With N dynamic TDD portions in a TXOP, N RRS symbols are allocated where each RRS symbol is used to resolve the link sharing for the corresponding dynamic TDD portion or slot, where N is an integer. Since each node may switch from RRS transmission to RRS monitoring, an additional guard period may be introduced between each RRS symbol or the RRS symbol design needs to take the switching time into account. The RRS design per symbol can follow a portion- or slot-level dynamic TDD design.

Figure 9:
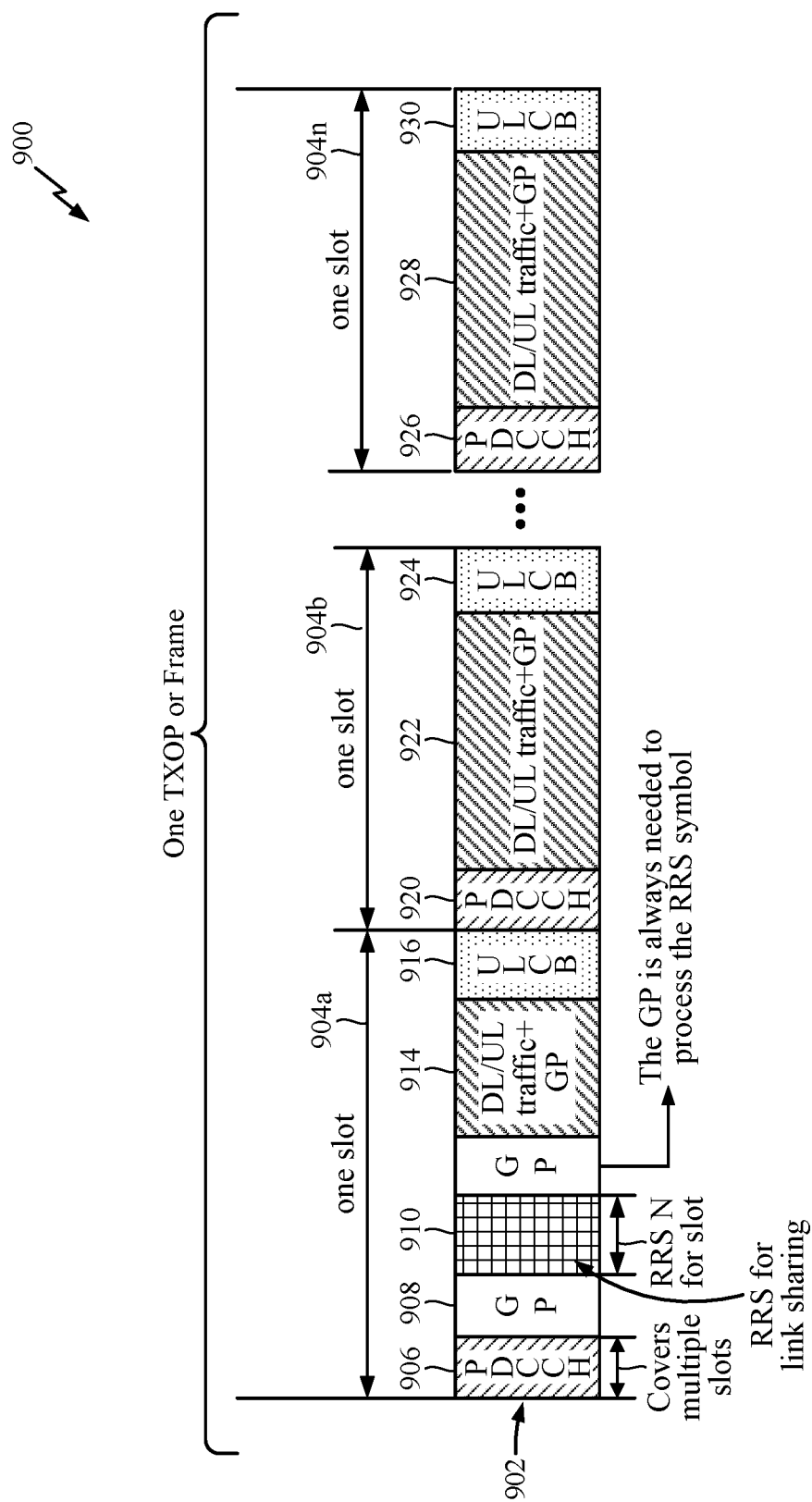
FIG. 9 illustrates another TDD dynamic signaling scheme in accordance with various aspects of the present disclosure.

FIG. 9 illustrates another TDD dynamic signaling scheme 900 in accordance with various aspects of the present disclosure. Similar to TDD dynamic signaling scheme 800, according to the dynamic TDD signaling scheme 900, a transmission opportunity 902 may include a plurality of portions or slots 904a, 904b, . . . 904n. In aspects, each portion or slot 904 may represent a self-contained subframe. A portion or slot 904 is assigned with a default link direction for data traffic communication. Such default link direction for traffic communication is known to network operators and/or nodes of the network. A first portion or slot 904a (enlarged in FIG. 9 for clarity) of the transmission opportunity 902 may include a PDCCH portion 906 including control information to trigger RSS signal(s) transmission or RSS(s) monitoring during the first portion or slot 904a, a first guard period 908, an uplink or downlink traffic and one or more associated guard periods portion 914, and an uplink control portion (e.g., an uplink control block (ULCB)) 916 of the self-contained subframe. The PDCCH portion 906 may include a grant of downlink or uplink resources for the first portion or slot 904a for the receiving wireless communication device UE 115. The first guard period 908 provides and/or accounts for processing time and/or switching time (e.g., at least associated with the control information triggering RSS signal(s) transmission or RSS(s) monitoring, and RSS(s) transmission or monitoring). Further, similar to the TDD dynamic signaling scheme 800, according to the dynamic TDD signaling scheme 900, the transmission opportunity 902 may include a second portion or slot 904b including a PDCCH portion 920, an uplink or downlink traffic and one or more associated guard periods portion 922, and an uplink control portion (e.g., an uplink control block (ULCB)) 924. The PDCCH portion 920 may include a grant of downlink or uplink resources for the second portion or slot 904b for the receiving wireless communication device 115. The wireless communication device 115 communicates with a BS 105 during a portion of the uplink or downlink traffic and associated guard period portion 922 based on the grant in the PDCCH portion 920. Further, similar to the TDD dynamic signaling scheme 800, according to the dynamic TDD signaling scheme 900, the transmission opportunity 902 may include an nth portion or slot 904n including a PDCCH portion 926, an uplink or downlink traffic and one or more associated guard periods portion 928, and an uplink control portion (e.g., an uplink control block (ULCB)) 930.

However, in contrast to the plurality of RRS symbols 810a, 810b, . . . 810n associated with the plurality of portions or slots 804a, 804b, . . . 804n, respectively of the TDD dynamic signaling scheme 800, the dynamic TDD signaling scheme 900, employs a reduced number of RRS symbols (e.g., one RRS symbol 910) in a first portion or slot 904a of a transmission opportunity 902 for link sharing. The RRS symbol 910 may be associated with the plurality of portions 904a, 904b, . . . 904n. During such RRS symbol 910, one or more wireless communication devices may communicate (e.g., transmit and/or receive) RRS respectively corresponding to the plurality of portions or slots 904a, 904b, . . . 904n. In this manner, a link sharing overhead may be further reduced (e.g., from n RRS symbols to one RRS symbol). In aspects, the dynamic TDD signaling scheme 900 may employ one or more of the following rules to facilitate use of a reduced number of symbols (e.g., one symbol) for signaling associated with the plurality of portions or slots 904a, 904b, . . . 904n. For example, a wireless communication device will be consistently scheduled for the transmission opportunity 902. More specifically, a UE 115 scheduled to communicate in the default direction in some portions having a default communication direction of downlink will not be scheduled to communicate in the switched direction in some other portions or slots having a default communication direction of downlink. Additionally or alternatively, a base station, such as a gNB, consistently communicates in the default communication direction of downlink directions or in the switched communication direction for all portions or slots in the transmission opportunity 902 having a default communication direction of downlink. In this case, the RRS for different portion or slot may or may not use the same frequency resources. Additionally or alternatively, a base station, such as a gNB, consistently communicates in the default communication direction of uplink or goes to the switched UL direction or in the switched communication direction for all portions or slots in the transmission opportunity 902 having a default communication direction of uplink. Additionally or alternatively, different frequency and/or code resources may be associated with RRSs for the plurality of portions or slots 904a, 904b, . . . 904n, respectively. For example, RRSs sent for different portions or slots use different frequency resources such that an RRS transmitted from one UE to communicate in a default communication direction of downlink direction does not prevent another UE from communicating in the switched communication direction in the same cell. Additionally or alternatively, RRS with different frequency resources for each portion or slot allows better sensing accuracy as the RRS from different portions or slots are orthogonal so nodes can determine the sensing result per portion or slot. Additionally or alternatively, a RRS from a base station 105, such as a gNB, and an RRS from a UE 115 are transmitted on orthogonal frequency resources. In this manner, a single RRS symbol may be employed by the dynamic TDD signaling scheme 900 because a communication node either sends one or more RRSs (e.g., if it is the receiver with the default link communication direction) or monitors for one or more RRSs (e.g., if it is the transmitter with the switched link communication direction).

The first portion or slot 904a may include a second guard period 910 after the RRS symbol 908 that provides and/or accounts for processing time and/or switching time (e.g., at least associated with the RRS symbol processing). In contrast to the TDD dynamic signaling scheme 800, the dynamic TDD signaling scheme 900, portion or slot 904a includes a single RRS symbol rather than the plurality of symbol 804a, 804b, . . . 804n in the portion or slot 804a which may result in more resources for uplink or downlink traffic communication for the portion or slot 904a. Furthermore, in aspects, the presence of the second guard period 912 is not optional based on a number of RRS symbols in the first portion or slot 904 since the second dynamic TDD signaling scheme 900 may employ one RRS symbol 908 in the first portion or slot 904.

Figure 10:
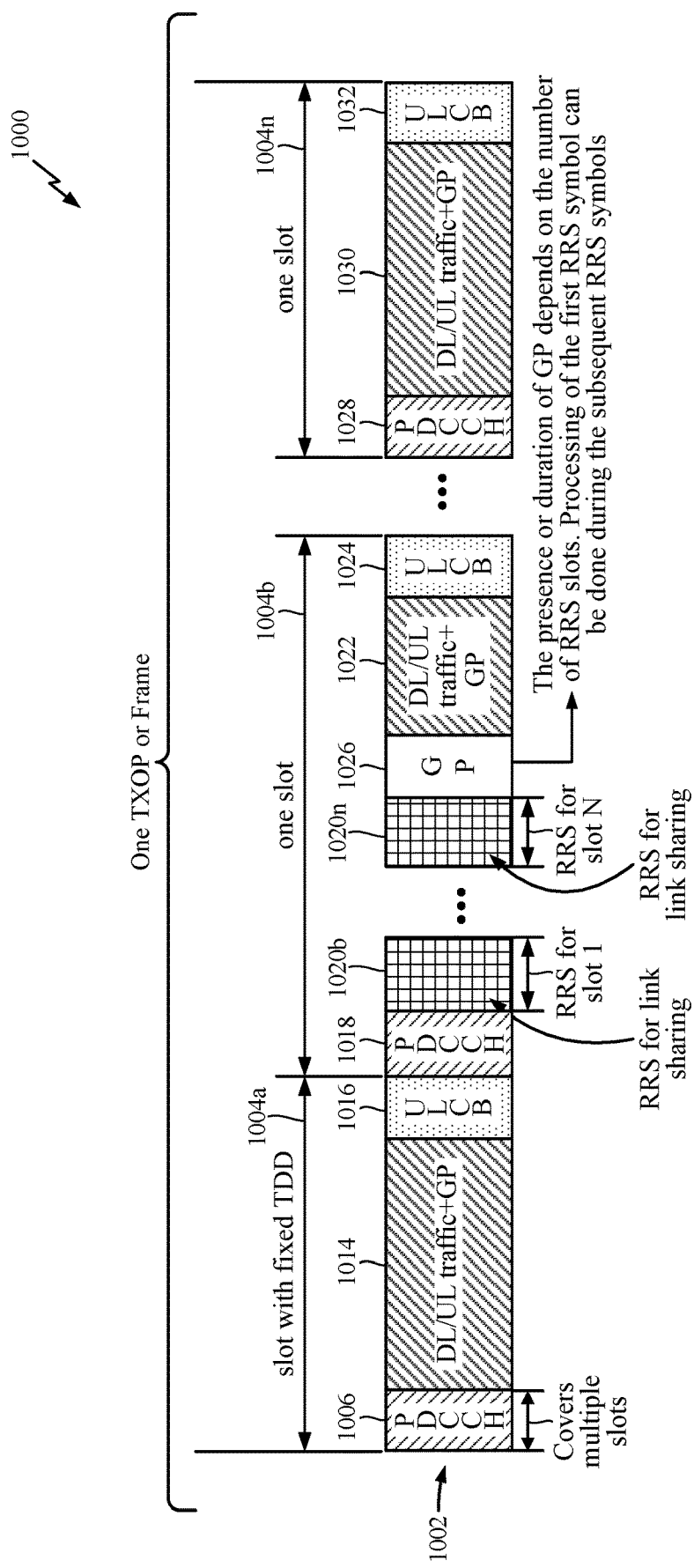
FIG. 10 illustrates another TDD dynamic signaling scheme in accordance with various aspects of the present disclosure.

FIG. 10 illustrates another TDD dynamic signaling scheme 1000 in accordance with various aspects of the present disclosure. Similar to TDD dynamic signaling scheme 800, according to the dynamic TDD signaling scheme 900, a transmission opportunity 1002 may include a plurality of portions or slots 1004a, 1004b, 1004n. For example, a first wireless communication device, such as a BS 105 or UE 115, may communicate with a second wireless communication device, such as a UE 115 or BS 105, in the one or more of the plurality of portions or slots 1004a, 1004b, 1004n. In aspects, each portion or slot 1004 may represent a self-contained subframe. A first portion or slot 1004a of the transmission opportunity 1002 may include a PDCCH portion 1006 including control information to trigger RSS(s) transmission or RSS(s) monitoring during a portion or slot subsequent to the first portion or slot 1004a, such as second portion or slot 1004b, an uplink or downlink traffic portion and one or more associated guard periods portion (1014) of the self-contained subframe, and an uplink control portion (e.g., an uplink control block (ULCB)) 1016. The PDCCH portion 1006 may include a grant of downlink or uplink resources for the first portion or slot 1004a for the receiving wireless communication device UE 115. In contrast to PDCCH portion 806 of the TDD dynamic signaling scheme 800 and PDCCH portion 906 of the TDD dynamic signaling scheme 900, the PDCCH portion 1006 of TDD dynamic signaling scheme 1000 includes control information to trigger RSS(s) transmission or RSS(s) monitoring during a portion or slot 1004b subsequent to the first portion or slot 1004a rather than the first portion or slot 1004a. Thus, according to the TDD dynamic signaling scheme 1000, the transmission opportunity 1002 may include a second portion or slot 1004b (enlarged in FIG. 10 for clarity) including a PDCCH portion 1018, a plurality of RRS symbols 1020b, 1020n associated with the plurality of portions or slots 1004b, . . . 1004n, respectively, an uplink or downlink traffic portion and one or more associated guard periods portion (1022) of the self-contained subframe, and an uplink control portion (e.g., an uplink control block (ULCB)) 1024. The PDCCH portion 1018 may include a grant of downlink or uplink resources for the second portion or slot 1004b for the receiving wireless communication device UE 115. During an RRS symbol 1020b, . . . 1020n, an RRS may be communicated. For example, a wireless communication device serving as a target receiver during the associated portion or slot 1004b, . . . 1004n may transmit an RRS during the RRS symbol 1020b, 1020n.

A wireless communication device serving as a target transmitter during the associated portion 1004b, . . . 1004n may monitor for an RSS during the RRS symbol 1020b, . . . 1020n. In this manner, the wireless communication device 115 receiving the PDCCH portion 1006 including control information to trigger RSS(s) transmission or RSS(s) monitoring during the second portion 1004b may send or monitor for an RSS in one or more of the plurality of RRS symbols 1020b, . . . 1020n to improve sharing of the link throughout the transmission opportunity. Furthermore, a node targeting transmission (e.g., in a switched link direction) during a portion 1004b, . . . 1004n of the transmission opportunity 1002 may monitor for an RSS during the associated RRS symbol 1020b, 1020n or portion thereof. In aspects, an RRS symbol 1020b, . . . 1020n may be configured to account for time for the wireless communication device 115 to switch at least from receiving (e.g., monitoring for an RRS) to transmitting (e.g., transmitting an RRS symbol), or vice versa. Additionally or alternatively, the second portion or slot 1004b may include a guard period after an RRS symbol 1020b, . . . 1020n to account for such switching time.

In aspects, second portion or slot 1004b may include second guard period 1026 after the plurality of RRS symbols 1020b, . . . 1020n to at least provide and/or account for processing of an RRS during RRS symbol 1004b associated with the second portion or slot 1004b. The presence and/or duration of the second guard period 1026 may be based on a number of the plurality of RRS symbols 1020b, . . . 1020n in the second portion or slot 1004b. For example, if RRS symbol 1004b may be processed during one or more of the remaining RRS symbols 1004*n*, the second guard period 1026 may not be used. Similar to the nth portion or slot 804*n* of the TDD dynamic signaling scheme 800 and the nth portion or slot 904*n* according to the dynamic TDD signaling scheme 900, the transmission opportunity 1002 may include an nth portion or slot 1004*n* including a PDCCH portion 1028, an uplink or downlink traffic portion and one or more associated guard periods portion (1030), and an uplink control portion (e.g., an uplink control block (ULCB)) 1032.

Because the first portion or slot 1004*a* does not include an RRS symbol, such portion or slot prior to the RRS transmission/monitoring follows the default link communication direction for the portion or slot 1004*a*, and such direction is not switched. Portions or slots 1004*b*, ... 1004*n* are assigned with a default link direction for traffic communication (e.g., data traffic communication). Such default link direction for traffic communication may be known to network operators and/or nodes of the network. Because the first portion or slot 1004*a* includes the control information to trigger RSS(s) transmission or RSS(s), but such RSS(s) transmission or RSS(s) monitoring occurs during one or more of the plurality of RRS symbols 1020*b*, 1020*n* in the second portion or slot 1004*b*, according to the TDD dynamic signaling scheme 1000, the first portion or slot 1004*a* does not include a guard period following the PDCCH portion 1006 to provide and/or account for the processing (e.g., decoding) time for the control information to trigger RRS(s) transmission or RRS (s) and/or switching time to send or monitor for an RRS. Because no such guard period is included, downlink or uplink traffic may be communicated during portion 1014 immediately subsequent to the PDCCH portion 1006.

Although the second portion or slot 1004*b* shown in FIG. 10 illustrates a plurality of RRS symbols, in aspects, the TDD dynamic signaling scheme 1000 may employ a reduced number of RRS symbols such as one RRS symbol in the second portion or slot. Such RRS symbol is similar to the RRS symbol RRS symbol 911 in the first portion or slot 904*a* according to the TDD dynamic signaling scheme 900. Further, for such aspects, the rules to facilitate use of a reduced number of symbols are employed.

Figure 11:
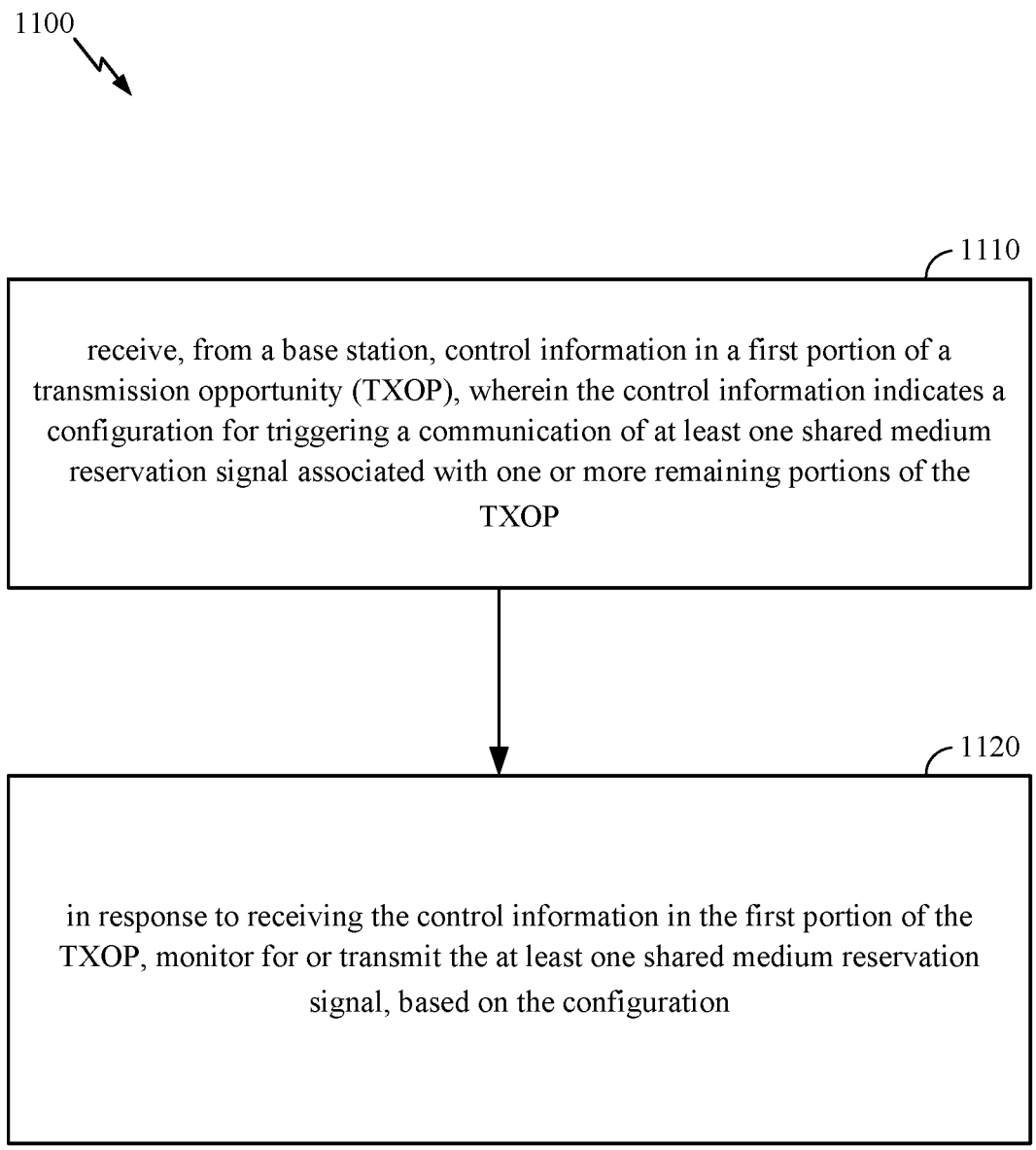
FIG. 11 is a flow diagram of a method for dynamic TDD in accordance with various aspects of the present disclosure.

FIG. 11 is a diagram of example operations 1100 for dynamic TDD in accordance with various aspects of the present disclosure. Operations 1100 may be performed by a UE, such as UE 500. As illustrated, operations 1100 of wireless communication (e.g., over a shared medium) includes a number of enumerated steps, but operations 1100 may include additional steps before, after, or in-between the enumerated steps. In some aspects, one or more of the enumerated steps may be omitted or performed in a different order.

At 1110, the UE receives, from a base station (such as BS 600), control information in a first portion of a transmission opportunity (TXOP), wherein the control information indicates a configuration for triggering a communication of at least one shared medium reservation signal associated with one or more remaining portions of the TXOP. At 1120, in response to receiving the control information in the first portion of the TXOP, the UE monitors for or transmits the at least one shared medium reservation signal, based on the configuration. In aspects, the shared medium reservation signal includes one of a sounding reference signal (SRS), a channel state information reference signal (CSI-RS), or a demodulation reference signal (DM-RS). In aspects, to further reduce link sharing overhead, the symbols of the shared medium reservation signal may be simplified into a single shared medium reservation signal. For example, the at least one shared medium reservation signal may comprise one shared medium reservation signal associated with one or more remaining portions (e.g., slot(s), symbol(s), or another structural element) of the TXOP. Some of the slots in the remaining portions may not change direction at all, e.g., the anchor slots may remain with the default direction, and therefore, the shared medium reservation signal only applies to slots with flexible direction. In aspects, control information (e.g., PDCCH trigger) may be sent at the beginning portion of the transmission opportunity (e.g., first slot) and dynamic TDD (e.g., shared medium reservation signal) may be applied in a subsequent portion (e.g., slot) of the transmission opportunity. In aspects, monitoring for or transmitting comprises monitoring for or transmitting the at least one shared medium reservation signal in a portion of the TXOP subsequent to the first portion. UL or DL traffic other than shared medium reservation signal may be carried out in the remaining part of the beginning portion (e.g., first slot) of the TXOP. In aspects, the UE may receive at least one downlink (DL) signal or transmit at least one uplink (UL) signal in a remaining part of the first portion not occupied by the control information, wherein the DL signal or the UL signal comprises a signal other than a shared medium reservation signal. In aspects, the TXOP may comprise a frame, each portion of the TXOP may comprise a slot, and each shared medium reservation signal may comprise a symbol. In aspects, the one or more remaining portions of the TXOP may be subsequent to the first portion. In aspects, the control information may be received on a physical downlink control channel (PDCCH).

Figure 12:
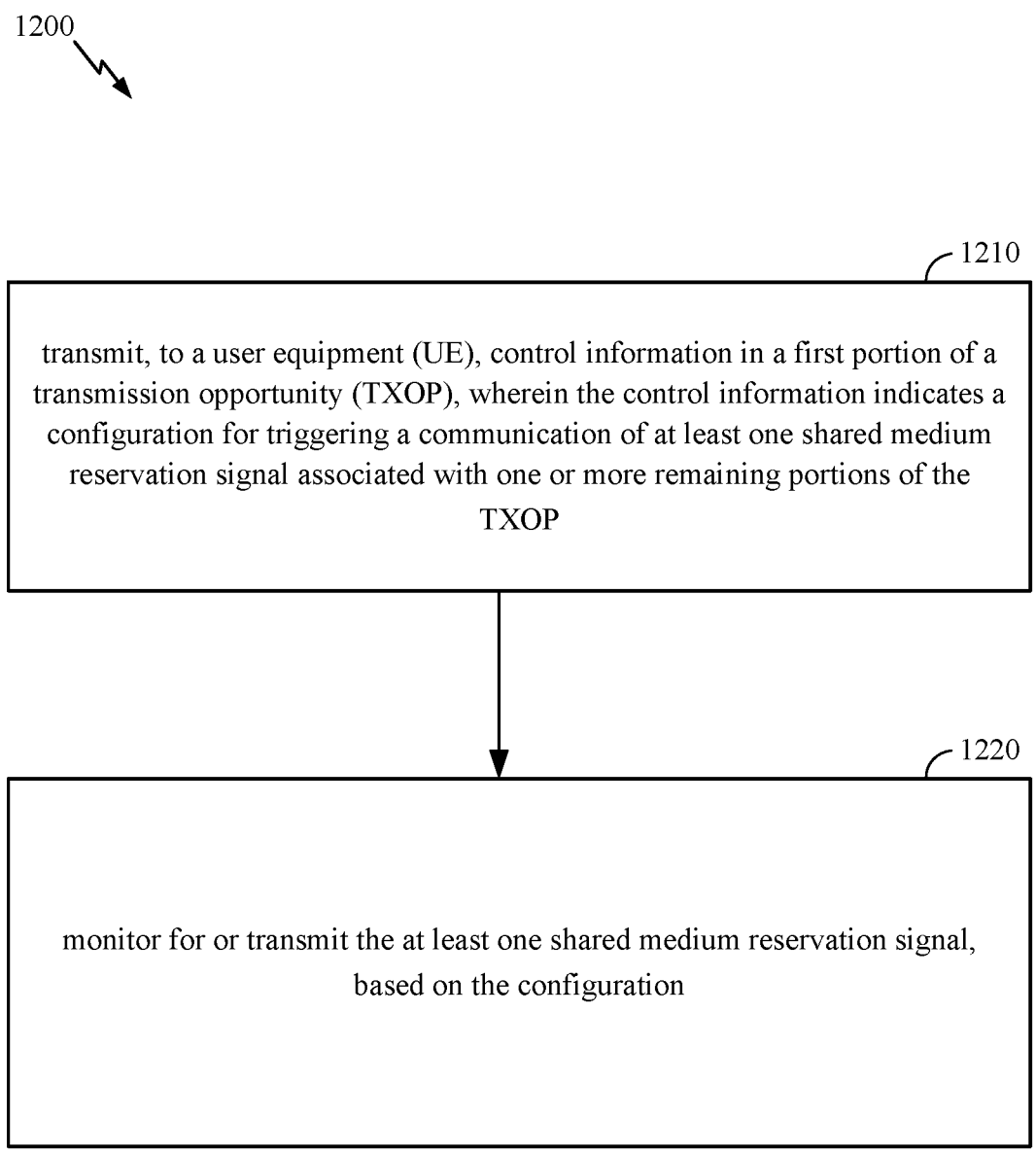
FIG. 12 is a flow diagram of a method for dynamic TDD in accordance with various aspects of the present disclosure.

FIG. 12 is a diagram of example operations 1200 for dynamic TDD in accordance with various aspects of the present disclosure. Operations 1200 may be performed by a BS, such as BS 600. As illustrated, operations 1200 of wireless communication (e.g., over a shared medium) includes a number of enumerated steps, but operations 1200 may include additional steps before, after, or in-between the enumerated steps. In some aspects, one or more of the enumerated steps may be omitted or performed in a different order.

At 1210, the BS transmits, to a UE (such as UE 500), control information in a first portion of a transmission opportunity (TXOP), wherein the control information indicates a configuration for triggering a communication of at least one shared medium reservation signal associated with one or more remaining portions of the TXOP. At 1220, the BS monitors for or transmits the at least one shared medium reservation signal, based on the configuration. In aspects, the shared medium reservation signal includes one of a sounding reference signal (SRS), a channel state information reference signal (CSI-RS), or a demodulation reference signal (DM-RS). In aspects, to further reduce link sharing overhead, the symbols of the shared medium reservation signal may be simplified into a single shared medium reservation signal. For example, the at least one shared medium reservation signal may comprise one shared medium reservation signal associated with one or more remaining portions (e.g., slot(s), symbol(s), or another structural element) of the TXOP. Some of the slots in the remaining portions may not change direction at all, e.g., the anchor slots may remain with the default direction, and therefore, the shared medium reservation signal only applies to slots with flexible direction. The reservation signal for different portions (e.g., slots) may use different frequency resources. For example, the shared medium reservation signal may occupy a different frequency resource for each portion of the one or more remaining portions of the TXOP.

Control information (e.g., PDCCH trigger) may be sent at the beginning portion of the transmission opportunity (e.g., first slot) and dynamic TDD (e.g., shared medium reservation signal) may be applied in a subsequent portion (e.g., slot) of the transmission opportunity. For example, monitoring for or transmitting may comprise monitoring for or transmitting the at least one shared medium reservation signal in a portion of the TXOP subsequent to the first portion. UL or DL traffic other than shared medium reservation signal may be carried out in the remaining part of the beginning portion (e.g., first slot) of the TXOP. For example, the BS may receive at least one uplink (UL) signal or transmit at least one downlink (DL) signal in a remaining part of the first portion not occupied by the control information, wherein the UL signal or the DL signal comprises a signal other than a shared medium reservation signal. In aspects, the TXOP may comprises a frame, each portion of the TXOP may comprise a slot, and each shared medium reservation signal may comprise a symbol. In aspects, the one or more remaining portions of the TXOP may be subsequent to the first portion. In aspects, the control information may be transmitted on a physical downlink control channel (PDCCH). In aspects, for default DL slots, the BS may issue PDCCH to trigger UE receiver in these slots to send reservation signal if BS intends to keep the DL direction, and the BS may issue PDCCH to trigger the intended UE receiver in these slots to monitor reservation signal from other UEs if the BS intends to switch the direction of those slots to UL. For example, one or more remaining portions of the TXOP may comprise at least one portion with a default downlink (DL) direction, and the control information may indicate a configuration for triggering the UE to: transmit the at least one shared medium reservation signal for the at least one portion, or monitor for a shared medium reservation signal transmitted from one or more other UEs for the at least one portion. In aspects, for default UL slots, the BS may send a reservation signal for these slots if the BS intends to keep the UL direction, and the BS may monitor reservation signal from other BSs if the BS intends to switch the direction of these slots to DL. For example, one or more remaining portions of the TXOP may comprise at least one portion with a default uplink (UL) direction, and the control information may indicate a configuration for triggering the UE to: monitor for a shared medium reservation signal from one or more other UEs for the at least one portion, or transmit the at least one shared medium reservation signal for the at least one portion, wherein the transmitting the at least one shared medium reservation signal comprises transmitting the at least one shared medium reservation signal for the at least one UL portion, and wherein the monitoring for the at least one shared medium reservation signal comprises monitoring for a shared medium reservation signal from one or more other BSs for the at least one portion In aspects, a first wireless communication device (e.g., UE such as UE 500 or BS such as BS 600) may be configured to receive communication from a second wireless communication device (e.g., BS such as BS 600 or UE such as UE 500) in the one or more remaining portions of the plurality of portions, and performing includes the first wireless communication device transmitting at least one shared medium reservation signal associated with the one or more remaining portions of the plurality of portions. In such aspects, receiving communication from the second wireless communication device in the one or more remaining portions of the plurality of portions includes receive communication from the second wireless communication device via the shared medium in a default link direction during the one or more remaining portions of the plurality of portions.

In aspects, the first wireless communication device is to transmit communication to a second wireless communication device in the one or more remaining portions of the plurality of portions, and performing includes the first wireless communication device monitoring for at least one shared medium reservation signal associated with the one or more remaining portions of the plurality of portions. In such aspects, transmit communication to the second wireless communication device in the one or more remaining portions of the plurality of portions includes transmit communication to the second wireless communication device via the shared medium in a link direction switched from a default link direction during the one or more remaining portions of the plurality of portions.

In aspects, the first wireless communication device is a UE communicating with a second wireless communication device like a base station, the control information at least in part triggers the UE to transmit at least one shared medium reservation signal associated with the one or more remaining portions of the plurality of portions, and performing includes the UE transmitting at least one shared medium reservation signal associated with the one or more remaining portions of the plurality of portions. In such aspects, the control information further triggers another UE to transmit at least one shared medium reservation signal associated with one or more other remaining portions of the plurality of portions. In such aspects, the UE communicates in a default link direction during the one or more remaining portions of the plurality of portions.

In aspects, the first wireless communication device is a UE communicating with a second wireless communication device like a base station, the control information at least in part triggers the UE to monitor for at least one shared medium reservation signal associated with the one or more remaining portions of the plurality of portions, and performing includes the UE monitoring for at least one shared medium reservation signal associated with the one or more remaining portions of the plurality of portions. In such aspects, the control information further triggers another UE to monitor for at least one shared medium reservation signal associated with one or more other remaining portions of the plurality of portions. In such aspects, the UE is to communicate in a link direction switched from the default link direction on the shared medium during the one or more remaining portions of the plurality of portions. In aspects, the first wireless communication device is a base station communicating with a UE, the base station receives a transmission from the UE during the one or more remaining portions of the plurality of portions, and performing includes the base station transmitting at least one shared medium reservation signal associated with the one or more remaining portions of the plurality of portions. In such aspects, receives a transmission from the UE includes communicates in a default link direction on the shared medium. In aspects, the first wireless communication device is a base station communicating with a UE, the base station is to transmit a transmission to the UE during the one or more remaining portions of the plurality of portions, and performing includes the base station monitoring for at least one shared medium reservation signal associated with one or more remaining portions of the plurality of portions.

As stated in aspects, performing includes performing during the first portion. In such aspects, a number of the at least one shared medium reservation signal is based on a number of the one or more remaining portions, and the first portion includes a number of shared medium reservation signal symbols corresponding to the number of the at least one shared medium reservation signal. In such aspects, each shared medium reservation signal symbol accounts for or is associated with a guard period for a link communication direction switching time. In such aspects, at least one of a presence or duration a guard period subsequent the shared medium reservation signal symbols in the first portion is based on the number of shared medium reservation signal symbols. In such aspects, the control information is associated a first guard period for a control information processing time, and each shared medium reservation signal symbol accounts for or is associated with a second guard period for a switching time of link communication direction.

In such aspects, a number of the at least one shared medium reservation signal is based on a number of the one or more remaining portions, and the first portion includes one shared medium reservation signal symbol associated with the at least one shared medium reservation signal. In such aspects, the one shared medium reservation signal symbol associated with one or more of the at least one shared medium reservation signal accounts for or is associated with at least one a guard period for a link communication direction switching time. In such aspects, shared medium reservation signals respectively transmitted by the first and second wireless communication devices in the shared medium reservation signal symbol are orthogonal. In such aspects, shared medium reservation signals associated with different respective portions are transmitted using at least one of different frequency or code resources in the one shared medium reservation signal symbol. In such aspects, the first wireless communication device is consistently scheduled by a second wireless communication device to communicate in a default link direction on the shared medium or to communicate in a link direction switched from the default link direction. In such aspects, the first wireless communication device consistently schedules the second wireless communication device to communicate in a default link direction on the shared medium or to communicate in a link direction switched from the default link direction. In such further aspects, the first wireless communication device consistently schedules the second wireless communication device and any other wireless communication devices to communicate in a default link direction on the shared medium. In such aspects, the first wireless communication device consistently schedules the second wireless communication device to communicate in a default link direction on the shared medium or to communicate in a link direction switched from the default link direction, wherein the default link direction is uplink. In such aspects, performing, by the first wireless communication device, includes transmitting the at least one shared medium reservation signal in a medium if the first wireless communication device is configured to receive communication from the second wireless communication device in the one or more remaining portions of the plurality of portions in a default link direction on the shared medium, or sensing for at least one shared medium reservation signal using the medium if the first wireless communication device is to transmit communication to the second wireless communication device in the one or more remaining portions of the plurality of portions in a link direction switched from the default link direction. In aspects, shared medium reservation signals associated with different TXOPs are transmitted in respective shared medium reservation signal symbols using at least one of different frequency or code resources.

In aspects, the control information triggering communication is not associated at least one guard period for a control information triggering communication processing time. In such aspects, the communication direction of the first portion is fixed. In such aspects, a number of the at least one shared medium reservation signal is based on a number of the one or more remaining portions, and a portion subsequent the first portion includes a number of shared medium reservation signal symbols corresponding to the number of the at least one shared medium reservation signal. In such further aspects, each shared medium reservation signal symbol accounts for or is associated with a guard period for a link communication direction switching time. In such further aspects, at least one of a presence or duration a guard period subsequent the shared medium reservation signal symbols in the portion subsequent the first portion is based on the number of shared medium reservation signal symbols. In such aspects, a number of the at least one shared medium reservation signal corresponds to a number of the one or more remaining portions, and the portion subsequent the first portion includes one shared medium reservation signal symbol corresponding to the number of the at least one shared medium reservation signal. In such further aspects, the one shared medium reservation signal symbol accounts for or is associated with at least one a guard period for one or more of a link communication direction switching time or a shared medium reservation signal processing time. In such aspects, a number of the at least one shared medium reservation signal is based on a number of the one or more remaining portions, and the portion subsequent the first portion includes one shared medium reservation signal symbol associated with the number of the at least one shared medium reservation signal. In such further aspects, a shared medium reservation signal symbol associated with one or more of the at least one shared medium reservation signal accounts for or is associated with at least one a guard period for a link communication direction switching time. In such further aspects, shared medium reservation signals respectively transmitted by the first and second wireless communication devices in the one shared medium reservation signal symbol are orthogonal. In such further aspects, shared medium reservation signal associated with different portions are transmitted using at least one of different frequency or code resources in the one shared medium reservation signal symbol. In such further aspects, the first wireless communication device is consistently scheduled by the second wireless communication device to communicate in a default link direction on the shared medium or to communicate in a link direction switched from the default link direction. In such further aspects, the first wireless communication device consistently schedules the second wireless communication device to communicate in a default link direction on the shared medium or to communicate in a link direction switched from the default link direction. The first wireless communication device consistently schedules the second wireless communication device and any other wireless communication devices to communicate in a default link direction on the shared medium. In such aspects, the first wireless communication device consistently schedules the second wireless communication device to communicate in a default link direction on the shared medium or to communicate in a link direction switched from the default link direction, wherein the default link direction is uplink. In such aspects, performing, by the first wireless communication device, includes transmitting the at least one shared medium reservation signal in a medium if the first wireless communication device is configured to receive communication from the second wireless communication device in the one or more remaining portions of the plurality of portions in a default link direction on the shared medium, or sensing for the at least one shared medium reservation signal using the medium if the first wireless communication device is to transmit communication from the second wireless communication device in the one or more remaining portions of the plurality of portions in a link direction switched from the default link direction.

In this manner, a frame (e.g., TXOP) based dynamic TDD may be employed to reduce RRS based sensing overhead. For example, for a frame or TXOP including multiple of portions and each portion in the TXOP has the associated default link direction, within the TXOP, some of the portions (e.g. anchor portions) may follow the default DL/UL direction and cannot be switched while others (e.g., flexible portions) could be dynamically switched. The anchor portions and the default link directions are common to all gNBs. In each TXOP, compared to the portion level dynamic TDD operation which has the overhead of link sharing by using PDCCH/GP/RRS/GP every portion, the TXOP based dynamic TDD operation resolves the link sharing at the beginning of each TXOP such that subsequent portions in the TXOP do not need to incur link sharing overhead. By placing link sharing or link sensing signals at the beginning, processing and/or switching time may be reduced. In aspects, the present apparatus and methods include cross portion link sharing signaling. In aspects, RRS may refer to a logical channel while its physical waveform can be realized by SRS, CSI-RS and/or DMRS, for example.

According to aspects, for TXOP based dynamic TDD, at the beginning of a given TXOP, if gNB wants to stay with the default direction for some of the non-anchor DL portions, it issues PDCCH to trigger the intended UE receiver in those portions to send RRS. The PDCCH trigger covers multiple UEs in multiple non-anchor DL portions with intended default direction. However, at the beginning of a given TXOP, if gNB wants to switch the default direction for some of the non-anchor DL portions, it issues PDCCH to trigger the intended UE transmitter in those portions to monitor RRS sent from other UEs. The PDCCH trigger covers multiple UEs in multiple non-anchor DL portions with the intended switched direction. Further, at the beginning of a given TXOP, if gNB wants to stay with the default direction for some of the non-anchor UL portions, the gNB sends out RRS for those portions. However, at the beginning of a given TXOP, if gNB wants to switch the default direction for some of the non-anchor UL portions, the gNB monitors RRS sent from other gNBs for those portions.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, hardwiring, or combinations of any of these. Features implementing functions may also be physically located at various positions, including being distributed such that portions of functions are implemented at different physical locations.

Moreover, the term "or" is intended to mean an inclusive "or" rather than an exclusive "or." That is, unless specified otherwise, or clear from the context, the phrase, for example, "X employs A or B" is intended to mean any of the natural inclusive permutations. That is, for example the phrase "X employs A or B" is satisfied by any of the following instances: X employs A; X employs B; or X employs both A and B. As used herein, reference to an element in the singular is not intended to mean "one and only one" unless specifically so stated, but rather "one or more." For example, the articles "a" and "an" as used in this application and the appended claims should generally be construed to mean "one or more" unless specified otherwise or clear from the context to be directed to a singular form. Unless specifically stated otherwise, the term "some" refers to one or more. A phrase referring to "at least one of" a list of items refers to any combination of those items, including single members. As an example, "at least one of: a, b, or c" is intended to cover: a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c). As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In some cases, rather than actually communicating a frame, a device may have an interface to communicate a frame for transmission or reception. For example, a processor may output a frame, via a bus interface, to an RF front end for transmission. Similarly, rather than actually receiving a frame, a device may have an interface to obtain a frame received from another device. For example, a processor may obtain (or receive) a frame, via a bus interface, from an RF front end for transmission.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in Figures, those operations may be performed by any suitable corresponding counterpart means-plus-function components.

For example, means for monitoring, means for triggering, means for performing, means for identifying, means for determining, means for suspending, means for resuming, means for enabling, means for selecting, means for transmitting, means for receiving, means for sending, means for comparing, means for prioritizing, means for assigning, means for allocating, means for rejecting, means for restricting, means for increasing, and/or means for decreasing may include one or more processors/controllers, transmitters, receivers, antennas, and/or other modules, components, or elements of a user equipment (e.g., UE 500) or a base station (e.g., BS 600).

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or combinations thereof.

Those of skill would further appreciate that the various illustrative logical blocks, modules, circuits, and algorithm steps described in connection with the disclosure herein may be implemented as hardware, software, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. One or more aforementioned devices or processors may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination thereof. A software module may reside in RAM memory, flash memory, ROM memory, EPROM memory, EEPROM memory, phase change memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, or combinations thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD/DVD or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. As those of some skill in this art will by now appreciate and depending on the particular application at hand, many modifications, substitutions and variations can be made in and to the materials, apparatus, configurations and methods of use of the devices of the present disclosure without departing from the spirit and scope thereof. Thus, the disclosure is not intended to be limited to the examples and designs described herein but is to be accorded the widest scope consistent with the principles and novel features disclosed herein.

What is claimed is:

1. A method of wireless communication over a shared medium by a user equipment (UE), comprising:
    receiving, from a base station, control information in a first portion of a transmission opportunity (TXOP), wherein the control information indicates a configuration for triggering a communication of at least one shared medium reservation signal associated with one or more remaining portions of the TXOP;
    in response to receiving the control information in the first portion of the TXOP, monitoring for or transmitting the at least one shared medium reservation signal in a portion of the TXOP subsequent to the first portion, based on the configuration; and
    receiving at least one downlink (DL) signal or transmitting at least one uplink (UL) signal in a remaining part of the first portion not occupied by the control information, wherein the DL signal or the UL signal comprises a signal other than a shared medium reservation signal.

2. The method of claim 1, wherein the at least one shared medium reservation signal comprises one shared medium reservation signal associated with the one or more remaining portions of the TXOP.

3. The method of claim 1, wherein the TXOP comprises a frame, each portion of the TXOP comprises a slot, and the at least one shared medium reservation signal comprises a symbol.

4. The method of claim 1, wherein the one or more remaining portions of the TXOP are subsequent to the first portion.

5. A method of wireless communication over a shared medium by a base station (BS), comprising:
   transmitting, to a user equipment (UE), control information in a first portion of a transmission opportunity (TXOP), wherein the control information indicates a configuration for triggering a communication of at least one shared medium reservation signal associated with one or more remaining portions of the TXOP;
   monitoring for or transmitting the at least one shared medium reservation signal in a portion of the TXOP subsequent to the first portion, based on the configuration; and
   receiving at least one uplink (UL) signal or transmitting at least one downlink (DL) signal in a remaining part of the first portion not occupied by the control information, wherein the UL signal or the DL signal comprises a signal other than a shared medium reservation signal.

6. The method of claim 5, wherein the at least one shared medium reservation signal comprises one shared medium reservation signal associated with the one or more remaining portions of the TXOP.

7. The method of claim 6, wherein the one shared medium reservation signal occupies a different frequency resource for each of the one or more remaining portions of the TXOP.

8. The method of claim 6,
   wherein the one or more remaining portions of the TXOP comprise at least one portion with a default uplink (UL) direction,
   wherein the transmitting the at least one shared medium reservation signal comprises transmitting the at least one shared medium reservation signal for the at least one portion, and wherein the monitoring for the at least one shared medium reservation signal comprises monitoring for a shared medium reservation signal from one or more other BSs for the at least one portion; and
   wherein the control information indicates a configuration for triggering the UE to: monitor for a shared medium reservation signal from one or more other UEs for the at least one portion, or transmit the at least one shared medium reservation signal for the at least one portion.

9. The method of claim 5, wherein the TXOP comprises a frame, each portion of the TXOP comprises a slot, and the at least one shared medium reservation signal comprises a symbol.

10. The method of claim 5, wherein the one or more remaining portions of the TXOP are subsequent to the first portion.

11. The method of claim 5,
    wherein the one or more remaining portions of the TXOP comprise at least one portion with a default downlink (DL) direction, and
    wherein the control information indicates a configuration for triggering the UE to: transmit the at least one shared medium reservation signal for the at least one portion, or monitor for a shared medium reservation signal transmitted from one or more other UEs for the at least one portion.

12. An apparatus for wireless communication over a shared medium, comprising:
    at least one processor;
    memory coupled to the at least one processor; and
    instructions stored in the memory and executable by the at least one processor to cause the apparatus to:
       receive, from a base station, control information in a first portion of a transmission opportunity (TXOP), wherein the control information indicates a configuration for triggering a communication of at least one shared medium reservation signal associated with one or more remaining portions of the TXOP;
       in response to receiving the control information in the first portion of the TXOP, monitor for or transmitting the at least one shared medium reservation signal in a portion of the TXOP subsequent to the first portion, based on the configuration; and
       receive at least one downlink (DL) signal or transmit at least one uplink (UL) signal in a remaining part of the first portion not occupied by the control information, wherein the DL signal or the UL signal comprises a signal other than a shared medium reservation signal.

13. The apparatus of claim 12, wherein the at least one shared medium reservation signal comprises one shared medium reservation signal associated with the one or more remaining portions of the TXOP.

14. The apparatus of claim 12, wherein the TXOP comprises a frame, each portion of the TXOP comprises a slot, and the at least one shared medium reservation signal comprises a symbol.

15. The apparatus of claim 12, wherein the one or more remaining portions of the TXOP are subsequent to the first portion.

16. An apparatus for wireless communication over a shared medium, comprising:
    at least one processor;
    memory coupled to the at least one processor; and
    instructions stored in the memory and executable by the at least one processor to cause the apparatus to:
       transmit, to a user equipment (UE), control information in a first portion of a transmission opportunity (TXOP), wherein the control information indicates a configuration for triggering a communication of at least one shared medium reservation signal associated with one or more remaining portions of the TXOP;
       monitor for or transmitting the at least one shared medium reservation signal in a portion of the TXOP subsequent to the first portion, based on the configuration; and
       receive at least one uplink (UL) signal or transmit at least one downlink (DL) signal in a remaining part of the first portion not occupied by the control information, wherein the UL signal or the DL signal comprises a signal other than a shared medium reservation signal.

17. The apparatus of claim 16, wherein the at least one shared medium reservation signal comprises one shared medium reservation signal associated with the one or more remaining portions of the TXOP.

18. The apparatus of claim 17, wherein the one shared medium reservation signal occupies a different frequency resource for each of the one or more remaining portions of the TXOP.

19. The apparatus of claim 16, wherein the TXOP comprises a frame, each portion of the TXOP comprises a slot, and the at least one shared medium reservation signal comprises a symbol.

20. The apparatus of claim 16, wherein the one or more remaining portions of the TXOP are subsequent to the first portion.

21. The apparatus of claim 16,
    wherein the one or more remaining portions of the TXOP comprise at least one portion with a default downlink (DL) direction, and wherein the control information indicates a configuration for triggering the UE to: transmit the at least one shared medium reservation signal for the at least one portion, or monitor for a shared medium reservation signal transmitted from one or more other UEs for the at least one portion.

22. The apparatus of claim 16, wherein the one or more remaining portions of the TXOP comprise at least one portion with a default uplink (UL) direction, wherein the transmitting the at least one shared medium reservation signal comprises transmitting the at least one shared medium reservation signal for the at least one portion, and wherein the monitoring for the at least one shared medium reservation signal comprises monitoring for a shared medium reservation signal from one or more other BSs for the at least one portion; and wherein the control information indicates a configuration for triggering the UE to: monitor for a shared medium reservation signal from one or more other UEs for the at least one portion, or transmit the at least one shared medium reservation signal for the at least one portion.

* * * * *